United States Patent
Galceran Mestres et al.

(10) Patent No.: US 12,322,801 B2
(45) Date of Patent: Jun. 3, 2025

(54) OLIVINE-TYPE COMPOUNDS: METHOD FOR THEIR PREPARATION AND USE IN CATHODE MATERIALS FOR SODIUM-ION BATTERIES

(71) Applicant: HYDRO-QUÉBEC, Montreal (CA)

(72) Inventors: Montse Galceran Mestres, Álava (ES); Montse Casas-Cabanas, Álava (ES); Abdelbast Guerfi, Varennes (CA); Michel Armand, Álava (ES); Teofilo Rojo, Álava (ES); Karim Zaghib, Varennes (CA); Andrea Paolella, Montreal (CA)

(73) Assignee: HYDRO-QUÉBEC, Montreal (CA)

( * ) Notice: Subject to any disclaimer, the term of this patent is extended or adjusted under 35 U.S.C. 154(b) by 0 days.

(21) Appl. No.: 18/145,348

(22) Filed: Dec. 22, 2022

(65) Prior Publication Data

US 2023/0207808 A1    Jun. 29, 2023

Related U.S. Application Data

(62) Division of application No. 16/064,738, filed as application No. PCT/IB2016/057840 on Dec. 20, 2016, now Pat. No. 11,569,506.

(Continued)

(51) Int. Cl.
*H01M 4/58* (2010.01)
*C01B 25/45* (2006.01)
(Continued)

(52) U.S. Cl.
CPC ........... *H01M 4/5825* (2013.01); *C01B 25/45* (2013.01); *H01M 4/364* (2013.01); *H01M 4/587* (2013.01);

(Continued)

(58) Field of Classification Search
CPC ..................................................... C01B 25/45
See application file for complete search history.

(56) References Cited

U.S. PATENT DOCUMENTS

| 10,270,097 B2 | 4/2019 | Miwa et al. |
| 2010/0203389 A1* | 8/2010 | Yoshida ................. C01B 25/45 252/182.1 |

(Continued)

FOREIGN PATENT DOCUMENTS

| CN | 1684290 A | 10/2005 |
| CN | 1691380 A | 11/2005 |

(Continued)

OTHER PUBLICATIONS

Armand, et al., "Building Better Batteries", Nature, vol. 451, 2008, pp. 652-657.

(Continued)

*Primary Examiner* — Peter F Godenschwager
(74) *Attorney, Agent, or Firm* — Womble Bond Dickinson (US) LLP

(57) ABSTRACT

Olivine-type compounds, their preparation and use in cathode materials for sodium-ion batteries. The olivine-type compounds may be obtained by a direct synthesis embodying a hydrothermal method. The method may include preparing an aqueous mixture including a M-containing compound, a M'-containing compound and a M"-containing compound to obtain a M-M'-M" mixture; adding a P-containing compound to the mixture M-M'-M" mixture to obtain a M-M'-M"-P mixture; adding a Na-containing compound to the M-M'-M"-P mixture to obtain a Na-M-M'-M"-P mixture; and introducing the Na-M-M'-M"-P mixture into an autoclave to perform crystal growth and obtain the compound of general formula $Na_hM_iM'_jM''_kPO_4$.

16 Claims, 22 Drawing Sheets

Related U.S. Application Data

(60) Provisional application No. 62/270,317, filed on Dec. 21, 2015.

(51) Int. Cl.
   *H01M 4/02* (2006.01)
   *H01M 4/36* (2006.01)
   *H01M 4/587* (2010.01)
   *H01M 10/054* (2010.01)

(52) U.S. Cl.
   CPC ....... *H01M 10/054* (2013.01); *C01P 2002/72* (2013.01); *C01P 2002/76* (2013.01); *C01P 2002/77* (2013.01); *C01P 2004/03* (2013.01); *C01P 2006/40* (2013.01); *H01M 2004/028* (2013.01)

(56) References Cited

U.S. PATENT DOCUMENTS

| | | |
|---|---|---|
| 2011/0031105 A1 | 2/2011 | Miyanaga |
| 2012/0258359 A1 | 10/2012 | Saka |
| 2020/0274162 A1 | 8/2020 | Galceran Mestres et al. |

FOREIGN PATENT DOCUMENTS

| | | | |
|---|---|---|---|
| CN | 102714302 A | 10/2012 | |
| CN | 104795564 A | 7/2015 | |
| JP | 2011054564 A | 3/2011 | |
| JP | 2011134550 A | 7/2011 | |
| JP | 2012180239 A | 9/2012 | |
| JP | 2013063898 A | 4/2013 | |
| JP | 2014225409 A | 12/2014 | |
| WO | 2011038499 A1 | 4/2011 | |
| WO | 2013031995 A1 | 3/2013 | |

OTHER PUBLICATIONS

Casas-Cabanas , et al., "Crystal Chemistry of Na Insertion/Deinsertion in FePO4—NaFePO4", Journal of Materials Chemistry, vol. 22, No. 34, 2012, pp. 17421-17423.
Office Action dated Jun. 2, 2021, issued in the corresponding Chinese Patent Application No. 201680074681.3, 28 pages including 12 pages of English Translation.
Second Office Action dated Jan. 26, 2022, issued in the corresponding Chinese Patent Application No. 201680074681.3, 17 pages including 7 pages of English Translation.
Ellis , et al., "Positive Electrode Materials for Li-Ion and Li-Batteries", Chemistry of Materials, vol. 22, No. 3, 2010, pp. 691-714.
Communication pursuant to Article 94(3) EPC dated Aug. 26, 2020, issued in the corresponding European Patent Application No. 16820023.6, 16 pages.
Fergus, Jeffrey W, "Recent Developments in Cathode Materials for Lithium Ion Batteries", Journal of Power Sources, vol. 195, Issue 4, Feb. 15, 2010, pp. 939-954.
Galceran , et al., "The Mechanism of NaFePO4 (de)sodiation Determined by in situ X-ray Diffraction", Physical Chemistry Chemical Physics, vol. 16, 2014, pp. 8837-8842.
Goodenough, John B, "Cathode Materials: A Personal Perspective", Journal of Power Sources, vol. 174, Issue 2, Dec. 6, 2007, pp. 996-1000.
Huang , et al., "Approaching Theoretical Capacity of LifePO4 at Room Temperature at High Rates", Electrochemical and Solid-State Letters, vol. 4, No. 10, 2001, pp. A170-A172.
Office Action (Examination Report) dated Jun. 9, 2020, issued in the corresponding Indian Patent Application No. 201817018152, 7 pages.
Office Action dated Feb. 23, 2022, issued in the corresponding Indian Patent Application No. 202118009248, 7 pages.
Office Action (Notice of reasons for Refusal) dated Nov. 18, 2020, issued in the corresponding Japanese Patent Application No. 20180533662, 7 pages including 4 pages of English Translation.
Office Action (Notice of Reasons for Rejection) dated Oct. 28, 2021, issued in the corresponding Japanese Patent Application No. 2018-533662, 6 pages including 4 pages of English Translation.
Kim , et al., "Electrode Materials for Rechargeable Sodium-Ion Batteries: Potential Alternatives to Current Lithium-Ion Batteries", Advanced Energy Materials, vol. 2, Issue 7, Jul. 2012, pp. 710-721.
Kim , et al., "Unexpected Discovery of Low-Cost Maricite NaFePO4 as a High-Performance Electrode for Na-ion Batteries", Energy & Environmental Science, vol. 8, 2015, pp. 540-545.
Koleva , et al., "Precursor-Based Methods for Low-Temperature Synthesis of Defectless Namnpo4 with an Olivine- and Maricite-Type Structure", CrystEngComm, vol. 15, 2013, pp. 9080-9089.
Komaba , et al., "Electrochemical Na Insertion and Solid Electrolyte Interphase for Hard-Carbon Electrodes and Application to Na-Ion Batteries", Advanced Functional Materials, vol. 21, Issue 20, Oct. 21, 2011, pp. 3859-3867.
Lee , et al., "Topochemical Synthesis of Sodium Metal Phosphate Olivines for Sodium-Ion Batteries", Chemistry of Materials, vol. 23, No. 16, 2011, pp. 3593-3600.
Li , et al., "Hollow Amorphous NaFePO4 Nanospheres as a High-Capacity and High-Rate Cathode for Sodium-ion Batteries", Journal of Materials Chemistry A, vol. 3, 2015, pp. 8265-8271.
Moreau , et al., "Structure and Stability of Sodium Intercalated Phases in Olivine FePO4", Chemistry of Materials, vol. 22, No. 14, 2010, pp. 4126-4128.
Newman , et al., "Ambient Temperature Cycling of an Na—TiS2 Cell", Journal of The Electrochemical Society, vol. 127, No. 10, 1980, pp. 2097-2099.
Ong , et al., "Voltage, Stability and Diffusion Barrier Differences Between Sodium-Ion and Lithium-Ion Intercalation Materials", Energy & Environmental Science, vol. 4, 2011, pp. 3680-3688.
Padhi , et al., "Phospho-olivines as Positive-Electrode Materials for Rechargeable Lithium Batteries", Journal of The Electrochemical Society, vol. 144, No. 4, Apr. 1997, pp. 1188-1194.
Page , et al., "The Crystal Structure of the New Mineral Maricite, NaFePO 4", The Canadian Mineralogist, vol. 15, No. 4, 1977, pp. 518-521.
Palomares , et al., "Na-ion Batteries, Recent Advances and Present Challenges to Become Low Cost Energy Storage Systems", Energy & Environmental Science, vol. 5, 2012, pp. 5884-5901.
Palomares , et al., "Update on Na-based Battery Materials. A Growing Research Path", Energy & Environmental Science, vol. 6, 2013, pp. 2312-2337.
Park , et al., "Synthesis of Multicomponent Olivine by a Novel Mixed Transition Metal Oxalate Coprecipitation Method and Electrochemical Characterization", Chemistry of Materials, vol. 22, No. 8, 2010, pp. 2573-2581.
Prosini , et al., "Sodium Extraction from Sodium Iron Phosphate with a Maricite Structure", Solid State Ionics, vol. 263, Oct. 1, 2014, pp. 1-8.
Slater , et al., "Sodium-Ion Batteries", Advanced Functional Materials, vol. 23, 2013, pp. 947-958.
Sun , et al., "Synthesis, Characterization, and Electrochemical Studies of Chemically Synthesized NaFePO4", Materials Science and Engineering: B, vol. 177, Issue 20, Dec. 1, 2012, pp. 1729-1733.
Tarascon, Jean-Marie , "Is Lithium the New Gold?", Nature Chemistry, vol. 2, No. 6, 2010, 1 page.
Tarascon , et al., "Issues and Challenges Facing Rechargeable Lithium Batteries", Nature, vol. 414, No. 15, Nov. 15, 2001, pp. 359-367.
Trad , et al., "Study of a Layered Iron(III) Phosphate Phase Na3Fe3(PO4)4 Used as Positive Electrode in Lithium Batteries", Journal of The Electrochemical Society, vol. 157, No. 8, 2010, pp. A947-A952.
Wadia , et al., "Resource Constraints on the Battery Energy Storage Potential for Grid and Transportation Applications", Journal of Power Sources, vol. 196, Issue 3, Feb. 1, 2011, pp. 1593-1598.
Whittingham, M. Stanley, "Lithium Batteries and Cathode Materials", Chemical Reviews, vol. 104, No. 10, 2004, pp. 4271-4302.

(56) References Cited

OTHER PUBLICATIONS

Zaghib, et al., "Characterization of Na-based Phosphate as Electrode Materials for Electrochemical Cells", Journal Power Sources, vol. 196, Issue 22, Nov. 15, 2011, pp. 9612-9617.
Zaghib, et al., "Review and Analysis of Nanostructured Olivine-Based Lithium Recheargeable Batteries: Status and Trends", Journal of Power Sources, vol. 232, Jun. 15, 2013, pp. 357-369.

* cited by examiner

OLIVINE-TYPE COMPOUNDS: METHOD FOR THEIR PREPARATION AND USE IN CATHODE MATERIALS FOR SODIUM-ION BATTERIES

CROSS REFERENCE TO RELATED APPLICATIONS

The present application is a divisional of U.S. application Ser. No. 16/064,738, filed on Jun. 21, 2018, which is a U.S. national stage of International Application No. PCT/IB2016/057840, filed on Dec. 20, 2016, which claims the benefit of U.S. Provisional Application No. 62/270,317, filed on Dec. 21, 2015. The entire contents of each of U.S. application Ser. No. 16/064, International Application No. PCT/IB2016/057840, and U.S. Provisional Application No. 62/270,317 are hereby incorporated herein by reference in their entirety.

FIELD OF THE INVENTION

The present invention relates generally to cathode materials for sodium-ion batteries. More specifically, the invention relates to olivine-type compounds, their preparation and use in cathode materials for sodium-ion batteries. The olivine-type compounds of the invention are obtained by a direct synthesis embodying a hydrothermal method.

BACKGROUND OF THE INVENTION

During the past two decades, the demand for Electrical Energy Storage (EES) systems has increased for portable applications and for static applications, predominantly in the form of batteries [1]. The most attractive path to store the energy in order to restore it as electricity is to convert chemical energy into electrical energy. Batteries provide stored chemical energy with the ability to deliver it as electrical energy with high conversion efficiency. Currently, Lithium ion (Li-ion) technology is the most used for portable applications and it is spreading to the automotive industry [2, 3].

Presently, the most important cathode materials for commercially available Li-ion batteries are the 3.5-4V (versus Li) $LiCoO_2$ (layered), $LiMn_2O_4$ (spinel), $LiFePO_4$ (olivine) and $LiMn_{1/3}Li_{1/3}Co_{1/3}O_2$ (layered), which deliver capacities of 150, 120, 155 and 160 mAh g-1, respectively [4, 5, 6]. The triphylite (olivine) lithium iron and manganese phosphates, $LiFePO_4$ (LFP) and $LiMnPO_4$ (LMnP), have been identified as suitable materials for Li-ion batteries [7, 8]; in particular, LFP is now a commercial success since it delivers the highest capacity (≈170 mAh g-1) in a safe voltage window [9]. LFP presents several features such as low cost, non-toxicity, high thermal stability, which are determinant for large-scaled applications such as hybrid electric vehicles (HEV) [10].

However, the future availability and the price of lithium led the research community to find suitable alternatives [11, 12]. In contrast to lithium, sodium is one of the most abundant elements on earth and its resources are virtually unlimited (for example, in the ocean). Moreover, sodium is the second lightest alkali metal next to the lithium ion. On the basis of element abundance, sodium ion batteries (NIBs) are an ideal alternative to lithium-ion batteries (LIBs). Moreover, the sodium technology is based on the same fundamental processes of ion intercalation as Li-ion [13, 14, 15, 16, 17]. Its redox potential is very suitable ($Eo_{(Na+/Na)}$=−2.71 V versus the standard hydrogen electrode), which is only 0.3 V above that of lithium leading to only a small energy penalty. On the basis of these findings, rechargeable sodium ion batteries are promising systems for electrochemical energy storage (EES) applications.

Sodium ion (Na-ion) batteries, structures, components, and charge storage mechanisms are similar to Li-ion batteries except that sodium ions are replaced instead of lithium ions [15]. Basically, a sodium-ion battery is constituted by two sodium insertion materials (one positive electrode and one negative electrode), which are soaked in the electrolyte as an ionic conductor. The final performance of the battery depends on the selected components. The first studies of sodium ion batteries were reported in 1980, when Newman et al. showed the highly reversible electrochemical sodium insertion into $TiS_2$ at room temperature [18]. Many of the materials suitable for Na-ion batteries are similar to their lithium counterparts, which have been exhaustively studied for the past 20 years for Li-ion batteries such as layered transition metal oxides, olivine, and NASICON frameworks. Moreover, the research into Na-ion batteries is exploring new polyanionic frameworks such as fluorophosphates, pyrophosphates, fluorosulfates, sulfates, and nitridophosphates, as well as Prussian-blue analogues as alternative cathode materials to the layered oxides and polyanion structures. FIG. 1 shows voltage versus capacity for reported materials for Na-ion batteries. One example that delivers one of the highest theoretical capacities is olivine $NaFePO_4$ (154 mAh g-1) which in turn is a low-cost and environmentally compatible material. For this reason, it is important to analyze the capability of sodium phospho-olivines as electrode materials in order to take advantage of them with respect to their features and previous studies of their Li counterpart ($LiFePO_4$) [19].

Contrary to $LiFePO_4$ (LFP), $NaFePO_4$ (NFP) can exist in two different structures; olivine and maricite [20, 21], both of which crystallize in the orthorhombic system with Pnma as a space group. Both structures display a similar framework composed of phosphate groups. The difference comes from the occupancy of the two octahedral sites by $Na^+$ and $Fe_2^+$ ions. In the olivine structure $Na^+$ and $Fe_2^+$ ions occupy the M1 and M2 positions, respectively (FIG. 2A), while in the maricite structure, the occupancy corresponds to the opposite site (FIG. 2B). Both of them are made of distorted $PO_4$ tetrahedra and distorted $FeO_6$ octahedra. In the olivine structure, $FeO_6$ octahedra are corner-shared forming 2D layers parallel to the bc plane, which are linked by $PO_4$ tetrahedra leading to 1D channels for $Na^+$ diffusion along the b direction, making it suitable for cathode material. In contrast, in the maricite structure, edge-sharing $FeO_6$ octahedra form chains along the b direction, which are linked by $PO_4$ tetrahedra building a 3D crystal structure. The connectivity of Na and Fe octahedral was thought to block $Na^+$ ion diffusion channels, limiting Na ion insertion and extraction.

Olivine $NaFePO_4$ is metastable with respect to maricite structured $NaFePO_4$, which was considered electrochemically inactive for a long time [19, 22]. Very recently and for the first time, Kim et al. showed that maricite $NaFePO_4$ can function as an excellent cathode material for rechargeable Na batteries [23]. They reported that Na ions can be inserted and deinserted from nano-sized maricite $NaFePO_4$ with simultaneous transformation into amorphous $FePO_4$. However, the high voltage achieved for the first desodiation could be an inconvenience for future commercial applications due to the electrolyte stability.

Olivine $NaFePO_4$ is the analog material of $LiFePO_4$, one of the most commercialized and suitable materials for Li-ion batteries (as discussed above). Nevertheless, a big challenge is to achieve the direct synthesis of the electrochemically active olivine NaFePO$_4$. Synthesis of NaFePO$_4$ using conventional methods such as hydrothermal or solid-state routes leads to the thermodynamical product maricite [24, 25]. Currently, the chemical or electrochemical cation exchange from LiFePO$_4$ is the most effective way for obtaining the electrochemically active NaFePO$_4$ with an olivine phase [21, 26, 27]. However, olivine structure can also be obtained using other indirect methods such as precursor-based methods for low temperature [28], topotactic reaction [29] and hollow amorphous NaFePO$_4$ via template method [30].

There is a need for novel olivine-type compounds for use in cathode materials for sodium-ion batteries. Also, there is a need for more efficient and cost-effective methods for preparing such compounds.

SUMMARY OF THE INVENTION

The inventors have designed and prepared novel olivine-type compounds for use in cathode materials for sodium-ion batteries. The compounds of the invention are sodium phospho-olivines. They are prepared by a direct synthesis which embodies a hydrothermal method. The preparation method of the invention is efficient and cost-effective.

The invention thus provides the following in accordance with aspects thereof:
(1) A compound of general formula Na$_h$M$_i$M'$_j$M''$_k$PO$_4$, wherein: 0<h≤1, 0≤i≤1, 0≤j≤1 and 0≤k≤1, and wherein M, M' and M'' are each independently a metal.
(2) A compound of general formula Na$_{1-x}$M$_x$M'PO$_4$, wherein: 0≤x<1, preferably, x≈0 or x≈0.1; and wherein M and M' are each independently a metal.
(3) A compound of general formula Na$_{1-x}$M$_x$M'$_{1-y}$M''$_y$PO$_4$, wherein: 0≤x<1 and 0≤y≤1, preferably x≈0 or x≈0.1 and 0≤y≤0.25; and wherein M, M' and M'' are each independently a metal.
(4) A compound of general formula NaM$_{1-x}$M'$_x$PO$_4$, wherein: 0≤x≤1, and wherein M and M' are each independently a metal.
(5) A compound of general formula NaM$_{1-x-y}$M'$_x$M''$_y$PO$_4$, wherein: 0≤x<1 and 0≤y<1 and x+y<1; and wherein M, M' and M'' are each independently a metal.
(6) A compound according to any one of (1) to (5) above, wherein the metal is selected from the group consisting of: Li, Mg, Ca, Mn, Fe, Co, Ni and Cu.
(7) A compound according to any one of (1) to (5) above, wherein the metal is selected from the group consisting of: Li, Mg, Ca, Mn, and Fe.
(8) A compound according to any one of (1) to (5) above, wherein the metal is selected from the group consisting of: Li, Mn, and Fe.
(9) A compound according to any one of (1) to (5) above, wherein the metal is selected from the group consisting of: Li and Mn.
(10) A compound according to any one of (1) to (9) above, which is a sodium phospho-olivine compound.
(11) A compound of general formula Na$_{1-x}$Li$_x$MnPO$_4$, wherein: 0≤x<1; preferably, x≈0 or x≈0.1.
(12) A compound having the formula Na$_{0.966}$Li$_{0.34}$MnPO$_4$.
(13) A compound of general formula Na$_{1-x}$Li$_x$Fe$_{1-y}$Mn$_y$PO$_4$ or Na$_{1-x}$Li$_x$Fe$_y$Mn$_{1-y}$PO$_4$, wherein: 0≤x<1 and 0≤y≤1, preferably x≈0 and 0≤y≤0.25.
(14) A compound having the formula Na$_{0.9}$Li$_{0.1}$Fe$_{0.22}$Mn$_{0.78}$PO$_4$ or Na$_{0.9}$Li$_{0.1}$Fe$_{0.25}$Mn$_{0.75}$PO$_4$.
(15) A compound of general formula NaMn$_{1-x}$Mg$_x$PO$_4$, wherein: 0≤x≤1.
(16) A compound of general formula Na$_{1-x}$Mg$_x$MnPO$_4$, wherein: 0≤x≤1.
(17) A compound of general formula NaFe$_{1-x-y}$Mn$_x$Li$_y$PO$_4$, wherein: 0≤x<1 and 0≤y<1 and x+y<1.
(18) A method of preparing a sodium phospho-olivine compound, the method comprising a hydrothermal method.
(19) A method of preparing a compound of general formula Na$_h$M$_i$M'$_j$M''$_k$PO$_4$, wherein: 0<h≤1, 0≤i≤1, 0≤j≤1 and 0≤k≤1, and wherein M, M' and M'' are each independently a metal, the method comprising the steps of:
  (a) preparing an aqueous mixture comprising a M-containing compound, a M'-containing compound and a M''-containing compound to obtain a M-M'-M'' mixture;
  (b) adding a P-containing compound to the mixture M-M'-M'' mixture to obtain a M-M'-M''-P mixture;
  (c) adding a Na-containing compound to the M-M'-M''-P mixture to obtain a Na-M-M'-M''-P mixture; and
  (d) introducing the Na-M-M'-M''-P mixture into an autoclave to perform crystal growth and obtain the compound of general formula Na$_h$M$_i$M'$_j$M''$_k$PO$_4$.
(20) The method of (19) above, further comprising the steps of: (e) fast-cooling the crystals; and (f) drying the cooled crystals.
(21) The method of (20) above, wherein step (f) is performed at a temperature of about 50-85° C., preferably 60-75° C.; for a period of about 6-12 hours, preferably about 8-10 hours.
(22) The method of (19) above, wherein step (a) comprises preparing separate aqueous solutions of the M-containing compound, the M'-containing compound and the M''-containing compound, first mixing two of the three solutions and then adding the third solution to obtain the M-M'-M'' mixture.
(23) The method of (19) above, wherein each of steps (a)-(c) is performed under stirring.
(24) The method of (19) above, wherein step (b) comprises preparing an aqueous solution of the Na-containing compound and adding the solution to the M-M'-M''-P mixture.
(25) The method of (19) above, wherein step (d) is performed under an atmosphere of O$_2$, N$_2$ or a combination thereof.
(26) The method of (19) above, wherein step (d) is performed at a temperature of about 150-250° C., preferably about 200° C.; for a period of about 2-6 hours, preferably about 4 hours; under a pressure of about 1.5-2.5 MPa, preferably about 2 MPa.
(27) The method of (19) above, wherein water used is deionized water bubbled under N$_2$.
(28) The method of (19) above, wherein the M-containing compound, the M'-containing compound and the M''-containing compound are each independently selected from the group consisting of MnSO$_4$, LiOH, FeSO$_4$ and MgSO$_4$; preferably, the compounds are each independently a hydrated compound.
(29) The method of (19) above, wherein the P-containing compound is H$_3$PO$_4$.
(30) The method of (19) above, wherein the Na-containing compound is NaOH.
(31) The method of (19) above, wherein the Na-containing compound is used in excess amount.

(32) The method of (19) above, wherein, in the general formula $Na_hM_iM'_jM''_kPO_4$, h=1 and 0≤i≤0.2 and 0≤j≤0.8 and 0.85≤i+j+k≤1.

(33) A cathode material for sodium-ion batteries, comprising a compound as defined in any one of (1) to (18) above.

(34) A cathode material for sodium-ion batteries, comprising a compound as defined in any one of (1) to (18) above and a carbon material.

(35) A cathode material for sodium-ion batteries, comprising a compound prepared by the method as defined in any one of (19) to (32) above.

(36) A cathode material for sodium-ion batteries, comprising a compound prepared by the method as defined in any one of (19) to (32) above and a carbon material.

(37) A cathode for sodium-ion batteries, comprising a cathode material as defined in any one of (33) to (36) above.

(38) A sodium-ion battery, comprising a cathode as defined in (37) above.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 8A shows peaks that correspond to maricite; and FIG. 8B shows refinements of both olivine and maricite structure, with $Y_{obs}$ (red line), $Y_{calc}$ (black line), $Y_{obs}$-$Y_{calc}$ (blue line) and Bragg position (vertical blue lines).

DESCRIPTION OF ILLUSTRATIVE EMBODIMENTS

Figure 1:
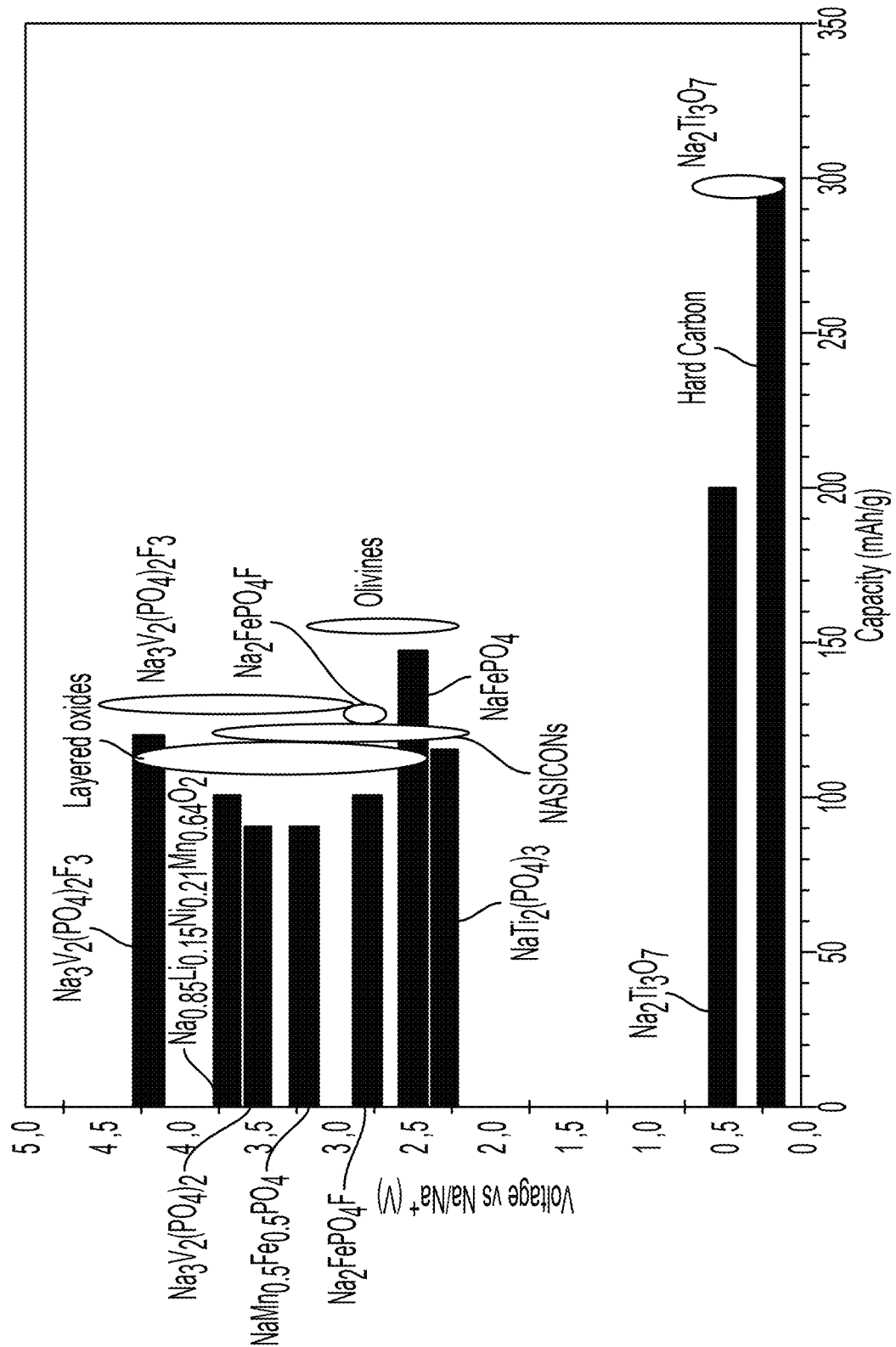
FIG. 1: Schematic illustration of voltage versus capacity of intercalation materials for sodium ion batteries, wherein theoretical capacities and achieved ones are shown with blue bars and green ovals, respectively.
Figure 2A:
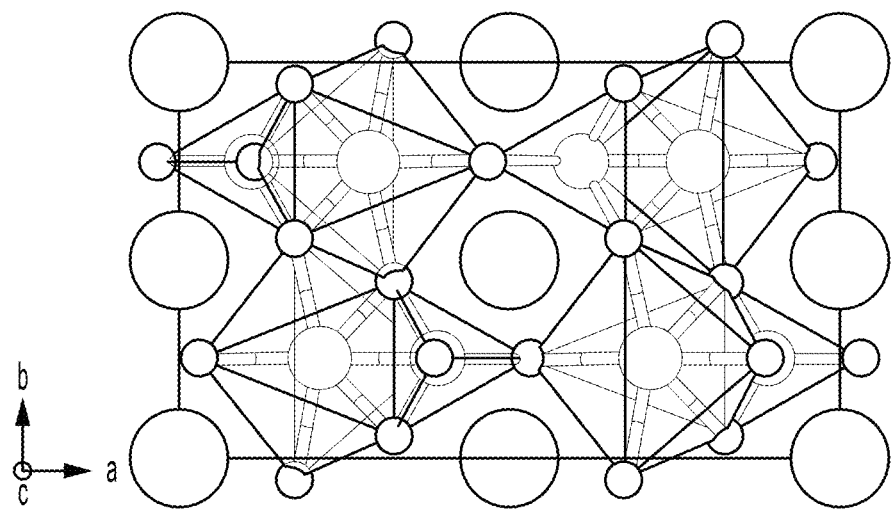
FIG. 2A: Schematic view of olivine-$NaFePO_4$.
Figure 2B:
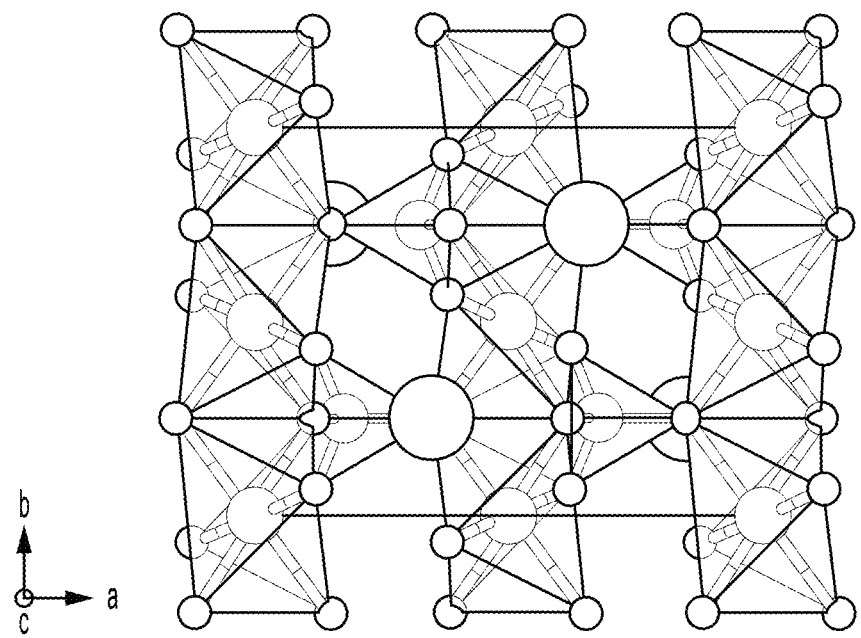
FIG. 2B: Schematic view of maricite-$NaFePO_4$.

The present invention relates to novel olivine-type compounds which may be used in cathode materials for sodium-ion batteries. The compounds of the invention are sodium phospho-olivines. They are prepared by a direct synthesis which embodies a hydrothermal method. The invention is illustrated in further details by the non-limiting examples outlined below.

Generally, direct synthesis of olivine $Na_{1-x}Li_xFe_{1-y}Mn_yPO_4$ was carried out by hydrothermal method. Sodium hydroxide (NaOH, Sigma Aldrich, 97%), iron sulfate ($FeSO_4·7H_2O$, Sigma Aldrich, 99%), manganese sulfate ($MnSO_4·H_2O$, Sigma Aldrich, 99%), lithium hydroxide ($LiOH·H_2O$, Sigma Aldrich, 98%) and orthophosphoric acid ($H_3PO_4$, Alfa Aesar, 85%) were used as precursors according to the following reaction:

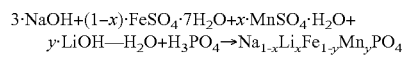

The following Table 1 outlines some detailed examples performed:

TABLE 1

Moles of reactants used for each hydrothermal synthesis

| | Compound | NaOH | FeSO$_4$·7H$_2$O | MnSO$_4$·H$_2$O | LiOH·H$_2$O | MgSO$_4$ | H$_3$PO$_4$ |
|---|---|---|---|---|---|---|---|
| Ex. 1 | Na$_{0.9}$Li$_{0.1}$MnPO$_4$ | 0.36 | — | 0.108 | 0.012 | — | 0.12 |
| Ex. 2 | Na$_{0.9}$Li$_{0.1}$MnPO$_4$ | 0.36 | — | 0.089 | 0.012 | — | 0.12 |
| Ex. 3 | Na$_{0.9}$Li$_{0.1}$Fe$_{0.22}$Mn$_{0.78}$PO$_4$ | 0.36 | 0.03 | 0.078 | 0.012 | — | 0.12 |
| Ex. 4 | Na$_{0.9}$Li$_{0.1}$Fe$_{0.22}$Mn$_{0.78}$PO$_4$ | 0.036 | 0.03 | 0.089 | 0.0012 | — | 0.012 |
| Ex. 5b | NaMnPO$_4$ | 0.036 | | 0.012 | | | 0.012 |
| Ex. 5a | NaMnPO$_4$ | 0.36 | — | 0.12 | | | 0.12 |
| Ex. 6 | NaMnMgPO$_4$ | 0.036 | — | 0.0108 | — | 0.0012 | 0.012 |
| Ex. 7 | Na$_{0.9}$Li$_{0.1}$Fe$_{0.50}$Mn$_{0.50}$PO$_4$ | 0.036 | 0.0054 | 0.0054 | 0.0012 | — | 0.012 |
| Ex. 8 | Na$_{0.9}$Li$_{0.1}$Fe$_{0.75}$Mn$_{0.25}$PO$_4$ | 0.036 | 0.0078 | 0.003 | 0.0012 | — | 0.012 |
| Ex. 9 | Na$_{0.9}$Li$_{0.1}$FePO$_4$ | 0.36 | 0.108 | — | 0.012 | | 0.12 |
| Ex. 10a | Na$_0$Fe$_{0.5}$Mn$_{0.5}$PO$_4$ | 0.036 | 0.006 | 0.006 | — | — | 0.012 |
| Ex. 10b | Na$_0$Fe$_{0.75}$Mn$_{0.25}$PO$_4$ | 0.036 | 0.009 | 0.003 | | | 0.012 |

Example 1: Preparation of Na$_{1-x}$Li$_x$MnPO$_4$ (x≈0.1, See Table 1)

Excess NaOH (0.36 moles) was dissolved in 100 mL of deionized water. 0.108 moles of MnSO$_4$·H$_2$O and 0.012 moles of LiOH·H$_2$O were then dissolved in 90 mL and 10 mL of deionized water, respectively. LiOH solution was added to MnSO$_4$ solution and mixed under stirring until a homogeneous solution was obtained. 0.12 moles of H$_3$PO$_4$ solution were added in a graduated cylinder, which was then filled to 100 mL with deionized water. This last solution was added to the Mn—Li and was stirred until a homogeneous solution was obtained. Finally, NaOH solution was added to the Mn—Li—P and was also stirred until a homogeneous dense solution was obtained. The pH of the final solution (total volume 300 mL) was 10. A glass liner was filled with the final solution/mixture and the autoclave was sealed under N$_2$ atmosphere. Powders crystallized in the olivine structure were grown in the autoclave under stirring at 200° C. for 4 hours (P≈2 MPa).

It should be noted that the deionized water was previously bubbled under N$_2$ for 4-5 hours. Also, the solutions, the mixtures and the autoclave sealing were carried out in a glove box under N$_2$ atmosphere. The obtained solution was the filtered and the product was washed with water (3-4 times) and ethanol (1 time). Subsequently, it was dried at 60-75° C. overnight.

Figure 3:
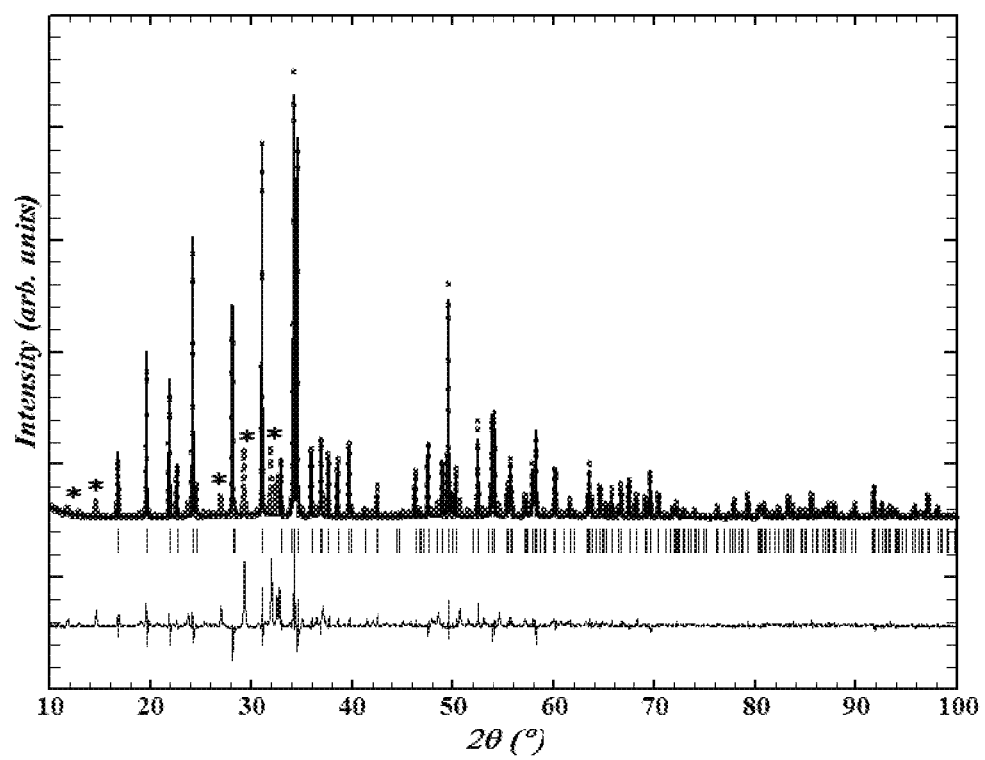
FIG. 3: Rietveld refinement of the XRD of $Na_{0.9}Li_{0.1}MnPO_4$, with $Y_{obs}$ (red line), $Y_{calc}$ (black line), $Y_{obs}$-$Y_{calc}$ (blue line) and Bragg position (vertical blue lines).
Figure 4A:
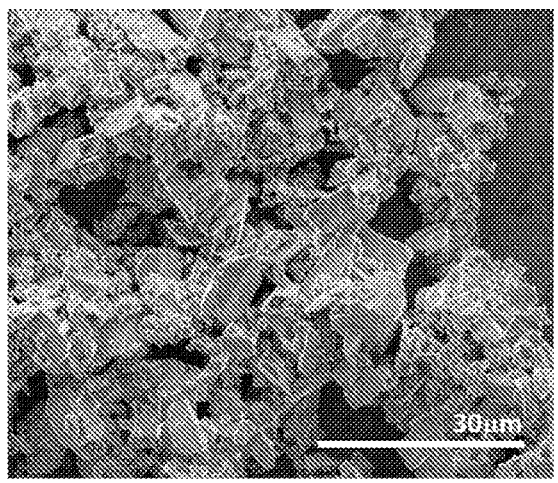
FIG. 4A and FIG. 4B: SEM images of $Na_{0.9}Li_{0.1}MnPO_4$.
Figure 4B:
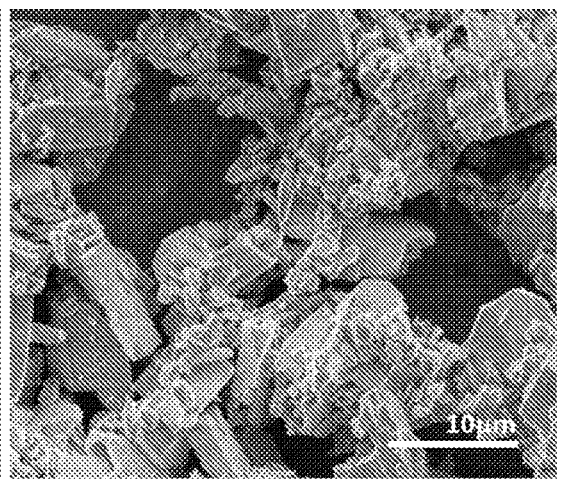

X-Ray diffraction measurement was used for the structural characterization. FIG. 3 shows the Rietveld refinement for the obtained compound, where impurities (maricite phase or unknown) are highlighted (*). After refinement, the unit cell parameters obtained were a=10.5391(6) Å, b=6.3307(4) Å and c=4.9906(3) Å, which are slightly lower than those reported for the olivine NaMnPO$_4$ with Pnma space group (see Table 2 below). This slight difference could be attributed to the small amount of Li in the structure. Electronic microscopy was used to study the degree of homogeneity and the particle size as well. As it can be seen from FIG. 4A and FIG. 4B, two different morphologies can be observed, one of which is attributed to the olivine iron manganese phosphate (big crystals) and the other one to impurities (small crystals). Compositional studies of the final product were carried out by EDAX analysis. These measurements demonstrated that the ratio for Na:Mn:P was close to 1:1:1 (Li ions cannot be detected by EDAX measurements, Table 3 below).

In this example, direct synthesis of olivine Na$_{1-x}$Li$_x$MnPO$_4$ has been demonstrated, with the presence of some unknown impurities and impurities attributable to the maricite phase.

TABLE 2

Refined unit cell parameters of olivine Na$_{1-x}$Li$_x$Fe$_{1-y}$Mn$_y$PO$_4$ and comparison with reported values for NaFePO$_4$ and NaMnPO$_4$ after a Rietveld refinement

| | | a | b | c |
|---|---|---|---|---|
| Ex. 1 | Na$_{0.9}$Li$_{0.1}$MnPO$_4$ | 10.5391(6) | 6.3307(4) | 4.9906(3) |
| Ex. 2 | Na$_{0.9}$Li$_{0.1}$MnPO$_4$ | 10.555(1) | 6.3383(9) | 4.9965(7) |
| Ex. 3 | Na$_{0.9}$Li$_{0.1}$Fe$_{0.22}$Mn$_{0.78}$PO$_4$ | 10.516(1) | 6.3060(7) | 4.9795(7) |
| Ex. 4 | Na$_{0.9}$Li$_{0.1}$Fe$_{0.25}$Mn$_{0.75}$PO$_4$ | 10.5249(9) | 6.3067(5) | 4.9745(5) |
| Ex. 5a | NaMnPO$_4$ | 10.5446(5) | 6.3294(3) | 4.9920(2) |
| Database | NaFePO$_4$ [21] | 10.4063(6) | 6.2187(3) | 4.9469(3) |
| Database | NaMnPO$_4$ [29] | 10.5578(3) | 6.3359(2) | 4.9966(2) |

TABLE 3

Summary of the composition of every compound determined by EDAX

| | | % At | | | | |
|---|---|---|---|---|---|---|
| | Compound | Na | Fe | Mn | P | O |
| Ex. 1 | Na$_{0.9}$Li$_{0.1}$MnPO$_4$ | 17.06 | — | 11.33 | 15.91 | 55.70 |
| Ex. 2 | Na$_{0.9}$Li$_{0.1}$MnPO$_4$ | 16.30 | — | 15.13 | 18.53 | 50.04 |
| Ex. 3 | Na$_{0.9}$Li$_{0.1}$Fe$_{0.22}$Mn$_{0.78}$PO$_4$ | 16.00 | 3.62 | 9.86 | 16.72 | 53.80 |
| Ex. 5b | Na$_{0.9}$Li$_{0.1}$Fe$_{0.25}$Mn$_{0.75}$PO$_4$ | 14.65 | 4.75 | 12.64 | 17.52 | 50.42 |
| Ex. 4 | Na$_{0.9}$Li$_{0.1}$FePO$_4$ | 17.90 | 13.40 | — | 17.20 | 51.50 |

Example 2: Preparation of Na$_{1-x}$Li$_x$MnPO$_4$ (x≈0.1, See Table 1)

In this case a lower amount of MnSO$_4$·H$_2$O was used with respect to Example 1 (see Table 1). Excess NaOH (0.36 moles) was dissolved in 100 mL of deionized water. Then 0.089 moles of MnSO$_4$·H$_2$O and 0.012 moles of LiOH·H$_2$O were dissolved in 90 mL and 10 mL of deionized water, respectively. LiOH solution was added to MnSO$_4$ solution and mixed under stirring until a homogeneous solution was obtained. 0.12 moles of solution of H$_3$PO$_4$ were added in a graduated cylinder, which was then filled to 100 mL with deionized water. This last solution was added to the Mn—Li solution and was stirred until a homogeneous solution was obtained. Finally, NaOH solution was added to the Mn—Li—P solution and was also stirred until a homogeneous dense solution was obtained. The pH of the final solution (total volume 300 mL) was 10. A glass liner was filled with the final solution/mixture and the autoclave was sealed under N$_2$ atmosphere. Powders crystallized in the olivine structure were grown in the autoclave under stirring at 200° C. for 4 hours (P≈2 MPa).

It should be noted that the deionized water was previously bubbled under $N_2$ for 4-5 hours, and that the solutions, the mixtures and the autoclave sealing were carried out in a glove box under $N_2$ atmosphere. However, a test was done using no bubbled water and sealing the autoclave under air, which also resulted in olivine phase.

After that the obtained solution was filtered and the product was washed with water (3-4 times) and ethanol (1 time). Then, it was dried at 60-75° C. overnight.

Figure 5:
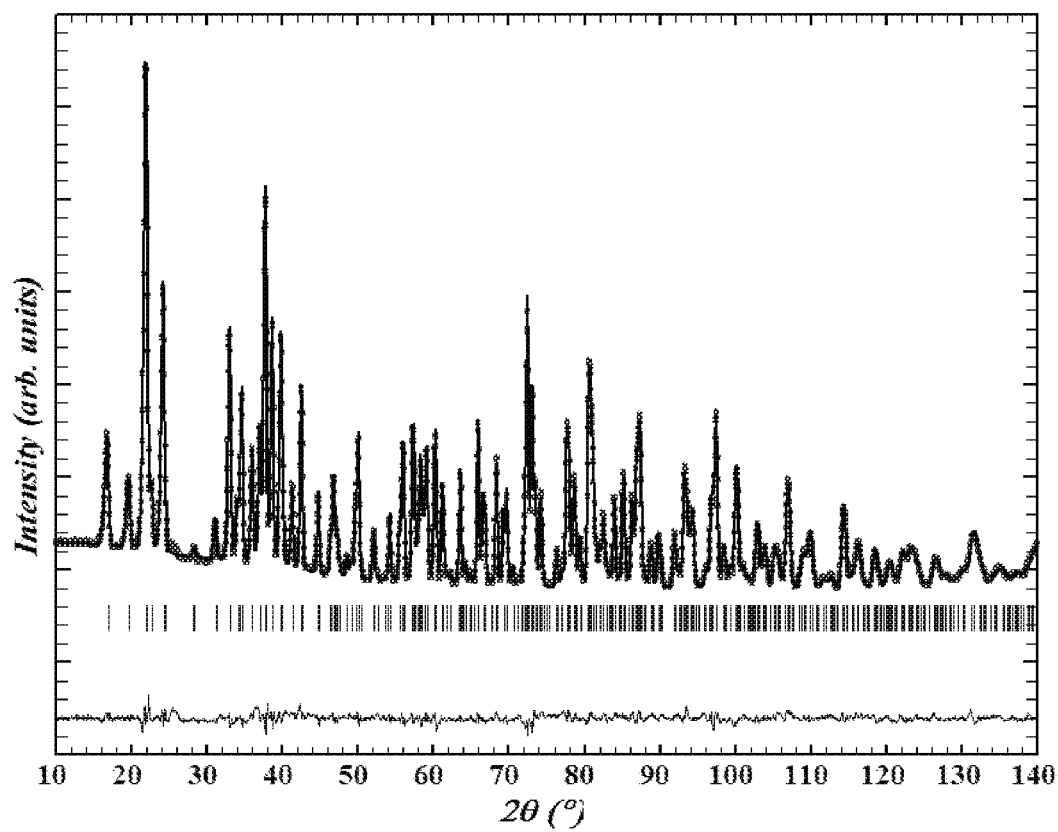
FIG. 5: Rietveld refinement of neutron powder diffraction of $Na_{0.966}Li_{0.034}MnPO_4$. $Y_{obs}$ (red line), $Y_{calc}$ (black line), $Y_{obs}$-$Y_{calc}$ (blue line) and Bragg position (vertical blue lines), wherein A=1.544402.
Figure 6A:
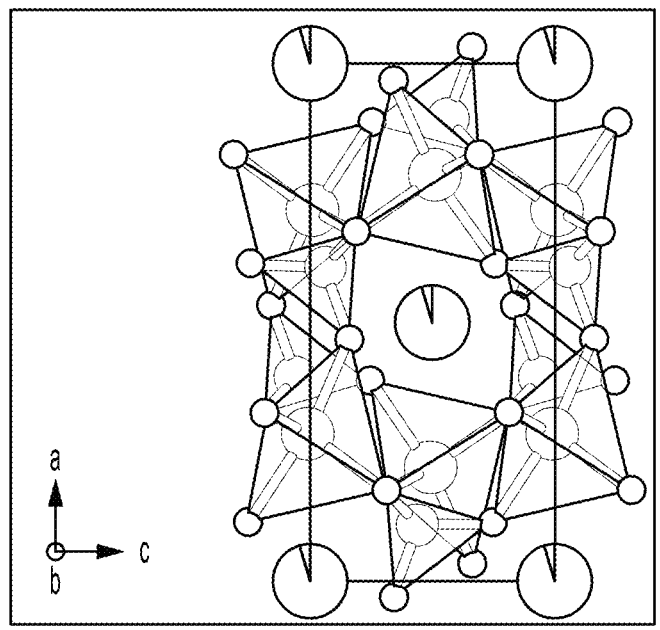
FIG. 6A and FIG. 6B: Schemes of a crystal structure for $Na_{0.966}Li_{0.034}PO_4$ along [010] and [001] directions, where sodium and lithium are located in the same position (blue-orange balls).
Figure 6B:
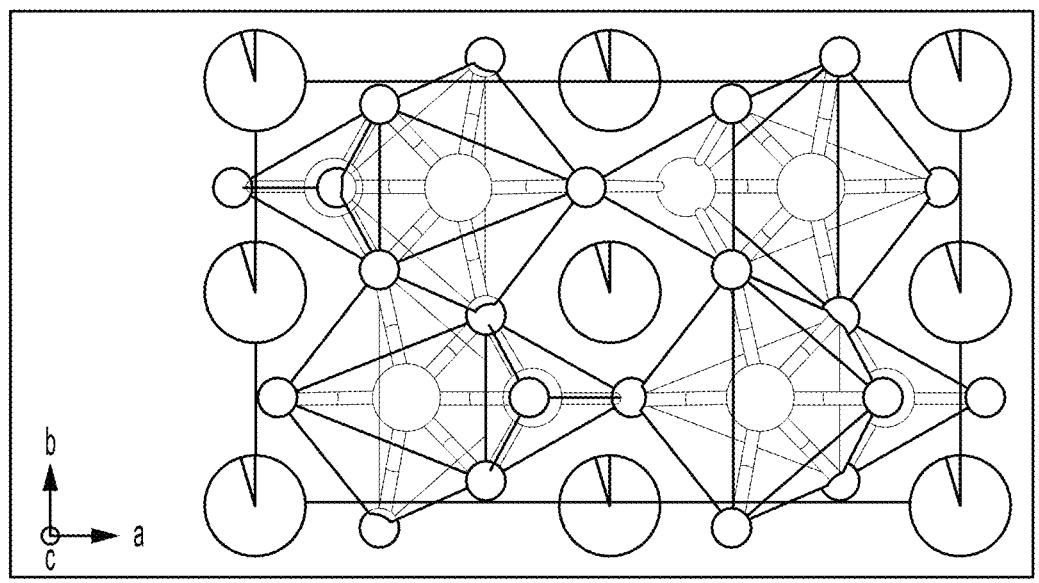

In this synthesis, a high degree of purity has been achieved. For this reason, the structural characterization was carried out using neutron powder diffraction. The aim of the use of neutron diffraction was to refine the occupancy and the site position of lithium ions. For the Rietveld refinement the olivine $NaMnPO_4$ structure was used as a starting structural model. FIG. 5 reveals that the compound crystallized with the characteristic orthorhombic olivine phase (Pnma). The unit cell parameters determined were a=10.555 (1) Å, b=6.3383(7) Å and c=4.9965(7) Å (Table 2). Thanks to the neutron diffraction, it was possible to refine the occupancies and to determine in which site lithium was located, and also the final composition of the compound. Table 4 below summarizes the atomic positions and the occupancies for each atom in the structure. Taking into account the results obtained in the Rietveld refinement, it was found that the Li is located in the sodium site with a final composition of $Na_{0.966}Li_{0.034}MnPO_4$. The polyhedral representations of the final crystal structure along [010] and [001] directions are shown in FIG. 6A and FIG. 6B.

TABLE 4

Final atomic coordinates, and occupancy of olivine $Na_{0.966}Li_{0.034}MnPO_4$

| atom | x | y | z | $B_{iso}$ | Occ. |
|---|---|---|---|---|---|
| Na | 0.00000 | 0.00000 | 0.0000 | 1.092(7) | 0.483(1) |
| Li | 0.00000 | 0.00000 | 0.0000 | 1.092(7) | 0.017(1) |
| Mn | 0.2841(1) | 0.75000 | 0.9922(3) | 0.543(3) | 0.5000 |
| P | 0.1065(1) | 0.75000 | 0.4385(3) | 0.568(2) | 0.5000 |
| O1 | 0.1132(1) | 0.75000 | 0.7450(2) | 0.734(1) | 0.5000 |
| O2 | 0.4676(1) | 0.75000 | 0.1610(2) | 0.734(1) | 0.5000 |
| O3 | 0.17524(7) | 0.9433(1) | 0.3233(1) | 0.734(1) | 1.0000 |

Figure 7A:
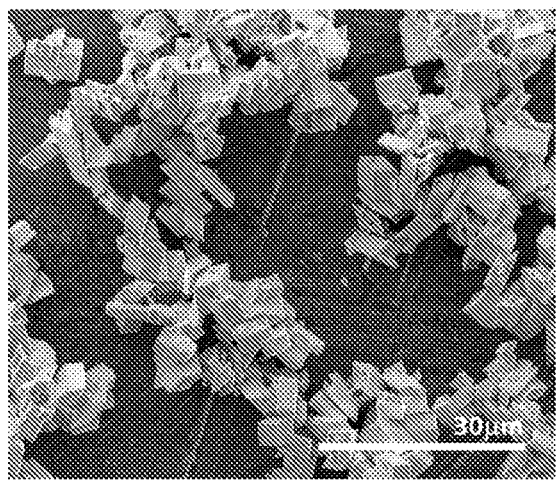
FIG. 7A and FIG. 7B: SEM images of $Na_{0.966}Li_{0.034}MnPO_4$.
Figure 7B:
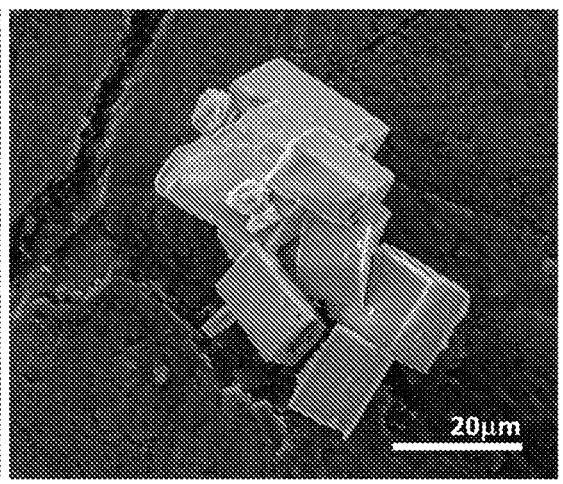

Moreover, the high degree of homogeneity can be seen from scanning electron microscopy images (FIG. 7A and FIG. 7B), where it shows that the particles have a rhombohedral-shape from 5 μm to 20 μm in length.

In this example, direct synthesis of olivine $Na_{0.966}Li_{0.034}MnPO_4$ has been demonstrated. In addition, the addition of the non-stoichiometric amount of $MnSO_4 \cdot H_2O$ leads to a more pure compound than the use of stoichiometric amount of $MnSO_4 \cdot H_2O$. Finally, neutron diffraction allowed for determining the occupancy and the site in the crystal structure for the lithium ion. It is confirmed that Li and Na are located in the same crystallographic position and that $LiOH \cdot H_2O$ is used in excess. However, the possibility of the presence of anitisites could not be ruled out.

Example 3: Preparation of a $Na_{1-x}Li_xFe_yMn_{1-y}PO_4$ (x≈0.1, y≈0.22, See Table 1)

Excess NaOH (0.36 moles) was dissolved in 100 mL of deionized water. Then, 0.03 moles of $FeSO_4 \cdot 7H_2O$, 0.78 moles of $MnSO_4 \cdot H_2O$, and 0.012 moles of $LiOH \cdot H_2O$ were dissolved in 25 mL, 65 mL, and 10 mL of deionized water, respectively. First, $FeSO_4$ solution was added to $MnSO_4$ and was stirred until a homogeneous solution was obtained. Then, LiOH solution was added to Fe—Mn solution and mixed under stirring until a homogeneous solution was obtained. 0.12 moles of $H_3PO_4$ solution were added in a graduated cylinder, which was filled to 100 mL with deionized water. This last solution was added to the Fe—Mn—Li solution, and it was stirred until a homogeneous solution was obtained. Finally, NaOH solution was added to the solution of Fe—Mn—Li—P, which was also stirred until a homogeneous dense solution was obtained. The pH of the final solution (total volume 300 mL) was 10. A glass liner was filled with the final solution/mixture and the autoclave was sealed under $N_2$ atmosphere. Powders crystallized in the olivine structure were grown in the autoclave under stirring at 200° C. for 4 hours (P≈2 MPa).

It should be noted that the deionized water was previously bubbled under $N_2$ for 4-5 hours. In addition, the solutions, the mixtures, and the autoclave sealing were carried out in a glove box under $N_2$ atmosphere. Afterwards, the obtained solution was filtered, and the product was washed with water (3-4 times) and ethanol (1 time). Then, it was dried at 60-75° C. overnight.

Figure 8A:
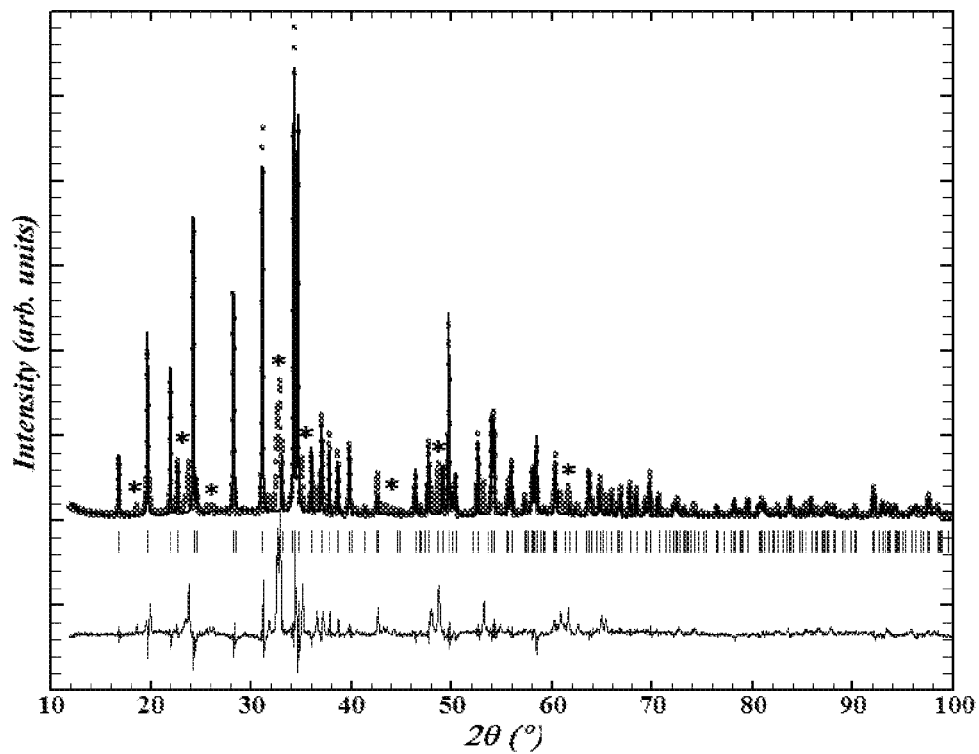
FIG. 8A and FIG. 8B: Rietveld refinements of XRD of $Na_{0.9}Li_{0.1}Fe_{0.22}Mn_{0.78}PO_4$.
Figure 8B:
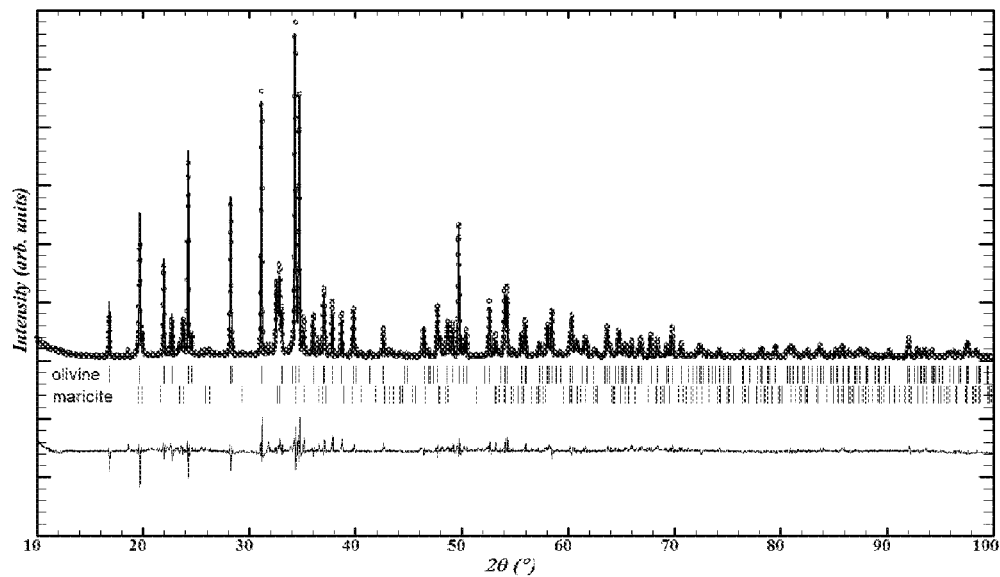

The structural characterization was carried out using X-Ray diffraction. The Rietveld refinement revealed that the compound crystallized with the orthorhombic olivine phase (Pnma), however, there are some peaks that correspond to maricite phase as impurities (*) (FIG. 8A). A second Rietveld refinement was carried out using both olivine and maricite structure which determined that the unit cell parameters for the olivine phase are a=10.516(1) Å, b=6.3060(7) Å and c=4.9795(7) Å (FIG. 8B and Table 2). Moreover, Rietveld refinement allows us to do a phase quantification, which determined that 75% corresponds to olivine and 25% to maricite.

Figure 9A:
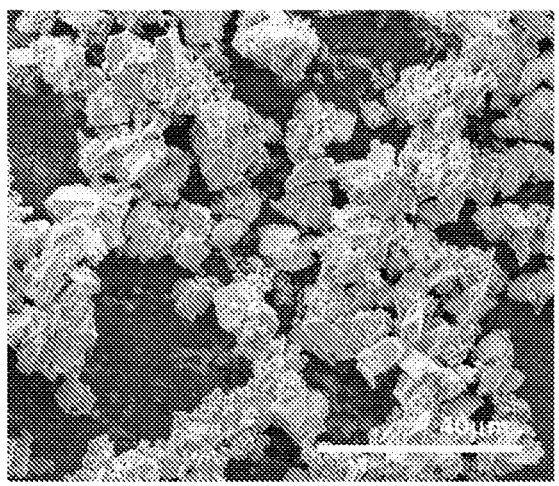
FIG. 9A and FIG. 9B: SEM images of $Na_{0.9}Li_{0.1}Fe_{0.22}Mn_{0.78}PO_4$.
Figure 9B:
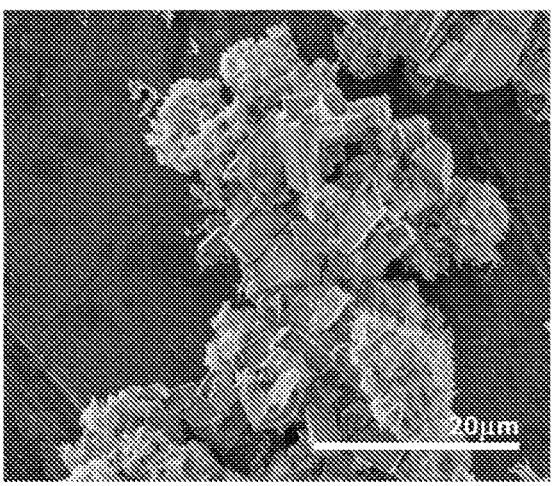

The scanning electronic images show the presence of two different morphologies; one of them corresponds to the olivine compound (rectangular-shaped) and the other one to the maricite as impurities (FIG. 9A and FIG. 9B). Moreover, EDAX measurements determined that the ratio for Na:Fe:Mn:P was close to 1:0.25:0.75:1. Li ions cannot be detected by EDAX detector, as in the previous example.

Neutron diffraction has been performed to be able to determine the atomic coordinates, the atomic occupancy, and to elucidate the amount of lithium as well as its site in the crystal structure. Due to the presence of impurities, obtaining a stable refinement for determining the final composition presented some challenges. Nevertheless, it has been used to confirm that the structure of $Na_{0.9}Li_{0.1}Fe_{0.22}Mn_{0.78}PO_4$ corresponds to the olivine phase.

In this example, the direct synthesis of olivine $Na_{0.9}Li_{0.1}Fe_{0.22}Mn_{0.78}PO_4$ has been demonstrated, with the presence of maricite phase as an impurity.

Example 4: Preparation of a $Na_{1-x}Li_xFe_yMn_{1-y}PO_4$ (x≈0.1, y≈0.25, See Table 1)

Excess NaOH (0.036 moles) was dissolved in 10 mL of deionized water. 0.003 moles of $FeSO_4 \cdot 7H_2O$, 0.0078 moles of $MnSO_4 \cdot H_2O$, and 0.0012 moles of $LiOH \cdot H_2O$ were then dissolved in 2.5 mL, 6.5 mL, and 10 mL of deionized water, respectively. First, $FeSO_4$ solution was added to $MnSO_4$ and was stirred until a homogeneous solution was obtained. Then, LiOH solution was added to Fe—Mn solution and mixed under stirring until a homogeneous solution was obtained.

After that, 0.012 moles of $H_3PO_4$ solution were added in graduated cylinder, which was then filled to 10 mL with deionized water. This last solution was added to the Fe—Mn—Li solution, and it was stirred until a homogeneous solution was obtained. Finally, NaOH solution was added to the solution of Fe—Mn—Li—P, which was also stirred until a homogeneous dense solution was obtained. The pH of the final solution (total volume 30 mL) was 10 or higher. Powders crystallized in the olivine structure were grown in the autoclave at 200° C. for 4 hours. In order to avoid any transformation from olivine to maricite, a fast cooling (quenching) of the autoclave was carried out.

After that, the obtained solution was filtered, and the product was washed with water (3-4 times) and ethanol (1 time). Then, it was dried at 60-75° C. overnight. It should be noted that the use of bubbled or non-bubbled deionized water does not affect to the final product. In both cases olivine phase has been obtained. Also, in this example, solutions, mixtures, and the autoclave sealing were carried out under $O_2$ atmosphere.

It has been observed that when kept under non-$O_2$ atmosphere (more than 1 hour purge under $N_2$ in a glovebox) the reaction is not successful. It seems that $O_2$ is necessary to obtain the olivine phase. In addition, fast cooling (quenching) has been used to avoid the phase transformation from olivine to maricite.

This methodology has also been used in Example 1 and Example 2, which, in both cases, results in pure olivine phase (not shown in this disclosure).

Figure 10:
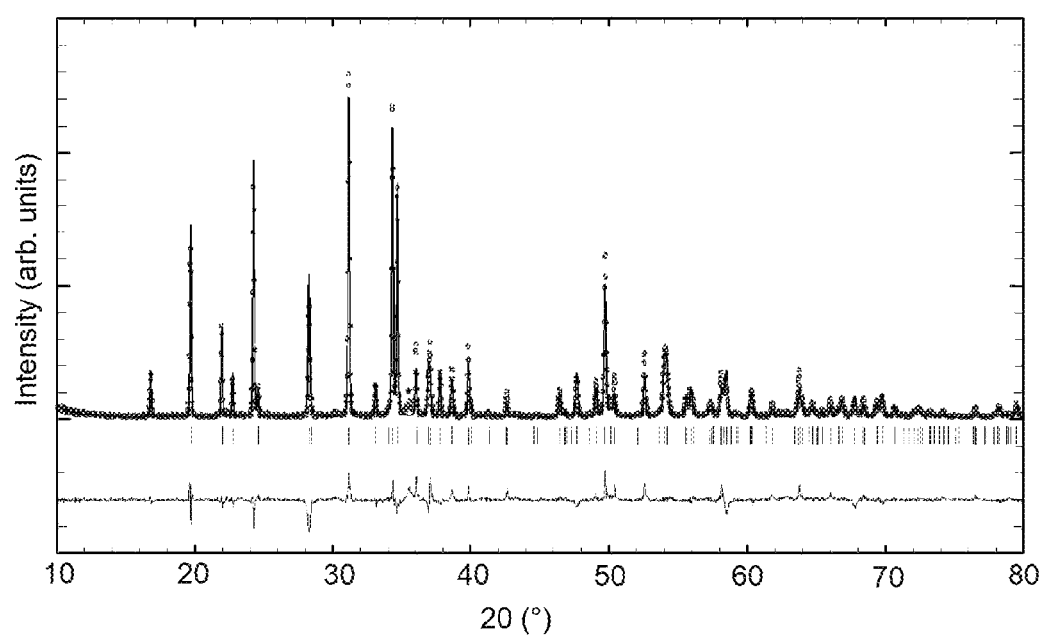
FIG. 10: Rietveld refinement of $Na_{0.9}Li_{0.1}Fe_{0.25}Mn_{0.75}PO_4$.
Figure 11B:
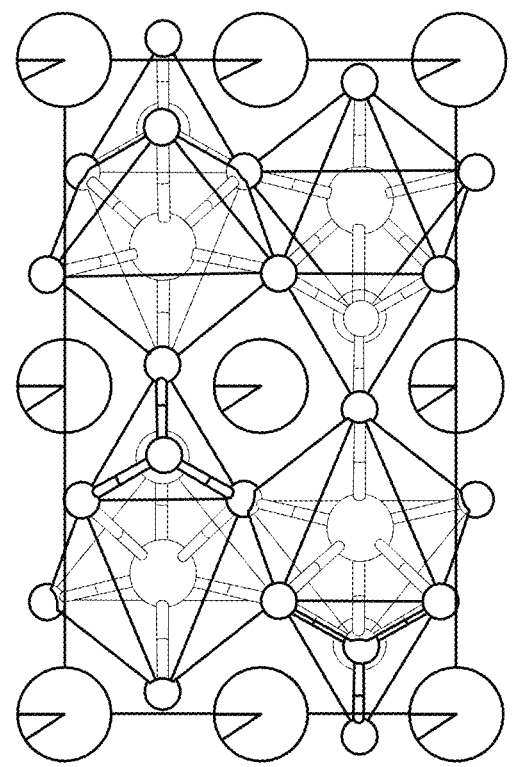
FIG. 11A and FIG. 11B: Schemes of a crystal structure of $Na_{0.9}Li_{0.1}Fe_{0.25}Mn_{0.75}PO_4$ along [010] and [001] directions, wherein sodium and lithium are located in the same position (blue-orange balls), and Mn and Fe share the same position (green-red).
Figure 11A:
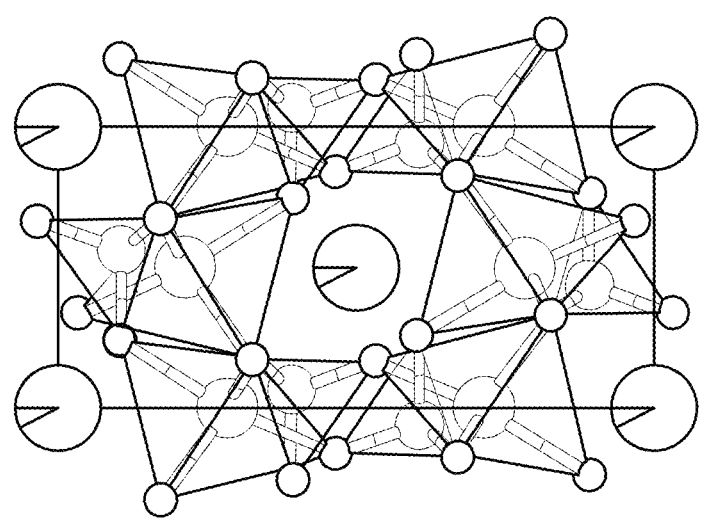
Figure 12:
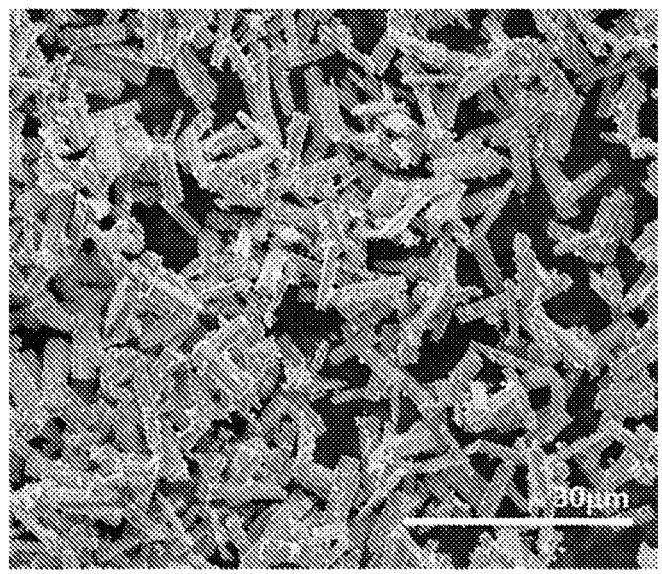
FIG. 12: SEM image of $Na_{0.9}Li_{0.1}Fe_{0.25}Mn_{0.75}PO_4$.

The structural characterization was carried out using X-Ray diffraction and the Rietveld refinement confirmed that the compound crystallized with the orthorhombic olivine phase (Pnma). The use of a quenching during the cooling process helps avoid the presence of maricite impurities. However, there is a small peak (*) which is attributable to an unknown impurity (FIG. 10). In the Rietveld refinement, the occupancy of Na:Fe:Mn:P was fixed according to the ICP measurement (1:0.25:0.75:1); the unit cell parameters were determined to be a=10.5249 (9) Å, b=6.3067 (5) Å and c=4.9745 (5) Å (Table 2). The polyhedral representations of the final crystal structure along [010] and [001] directions are shown in FIG. 11A and FIG. 11B. The scanning electronic images show the presence of rectangular-shaped single particles with a width of 1.5-2 µm and from 6 to 12 µm long (FIG. 12).

In this example, direct synthesis of olivine $Na_{0.9}Li_{0.1}Fe_{0.25}Mn_{0.75}PO_4$ has been demonstrated, with an absence of maricite phase as impurity thanks to fast cooling (quenching). This reaction was carried out in $O_2$ and using no-bubbled deionized water.

Examples 5a and 5b: Preparation of $NaMnPO_4$ (x≈0.1, See Table 1)

Example 5a: Reaction Under $O_2$ Atmosphere

Excess NaOH (0.036 moles) was dissolved in 10 mL of deionized water. Then 0.012 moles of $MnSO_4 \cdot H_2O$ were dissolved in 10 mL of deionized water. 0.012 moles of solution of $H_3PO_4$ were added in a graduated cylinder, which was then filled to 10 mL with deionized water. This last solution was added to the Mn solution and was stirred until a homogeneous solution was obtained. Finally, NaOH solution was added to the Mn—P solution and was also stirred until a homogeneous dense solution was obtained (total volume 30 mL). A Teflon liner was filled with the final solution/mixture and the autoclave was sealed in $O_2$ atmosphere. Powders crystallized in the olivine structure were grown in the autoclave under stirring at 200° C. for 4 hours.

In this embodiment of the invention, the deionized water was not bubbled previously. Further, the solutions, the mixtures, and the autoclave sealing were carried out in air atmosphere. Afterwards, the obtained solution was filtered, and the product was washed with water (3-4 times) and ethanol (1 time). Then, it was dried at 60-75° C. overnight.

Figure 13:
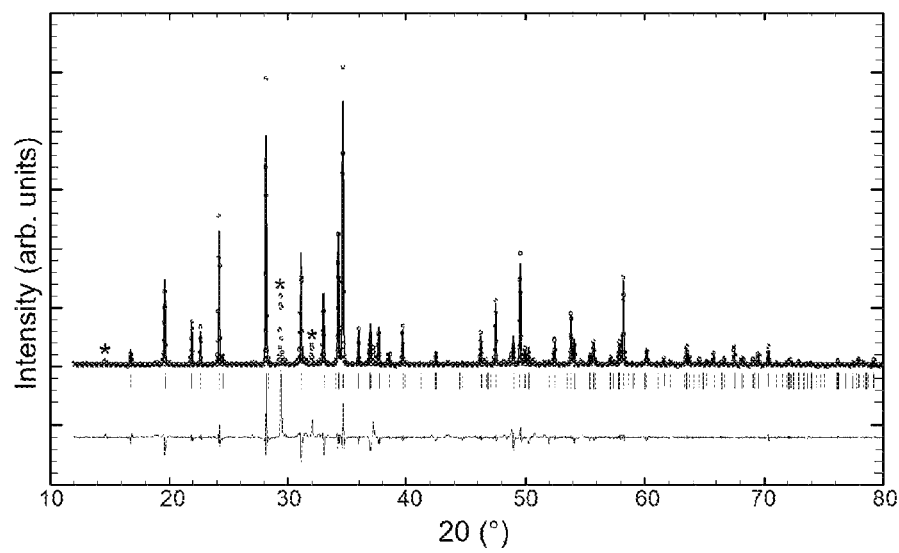
FIG. 13: Lebail profile matching of $NaMnPO_4$ olivine phase.

X-Ray diffraction was used for the phase identification and the structural characterization. FIG. 13 corresponds to a LeBail profile matching which reveals that the compound crystallized with the characteristic orthorhombic olivine phase (Pnma). The unit cell parameters were determined to be a=10.5446(5) Å, b=6.3294(3) Å and c=4.9920(2) Å (Table 2). In this case, the impurities are not attributed to maricite phase.

Example 5b: Reaction Under $N_2$ Atmosphere

Excess NaOH (0.36 moles) was dissolved in 100 mL of deionized water. Then 0.108 moles of $MnSO_4 \cdot H_2O$ were dissolved in 100 mL. Then, 0.12 moles of $H_3PO_4$ solution were added in a graduated cylinder, which was then filled to 100 mL with deionized water. This last solution was added to the Mn-solution and was stirred until a homogeneous solution was obtained. Finally, NaOH solution was added to the Mn—P and was also stirred until a homogeneous dense solution was obtained (total volume 300 mL). A glass liner was filled with the final solution/mixture and the autoclave was sealed under $N_2$ atmosphere. Powders crystallized in the maricite structure were grown in the autoclave under stirring at 200° C. for 4 hours (P=2 MPa).

In this embodiment of the invention, the deionized water was previously bubbled under $N_2$ for 4-5 hours. In addition, the solutions, the mixtures, and the autoclave sealing were carried out in a glove box under $N_2$ atmosphere. After that, the obtained solution was filtered, and the product was washed with water (3-4 times) and ethanol (1 time). Then, it was dried at 60-75° C. overnight.

Figure 14:
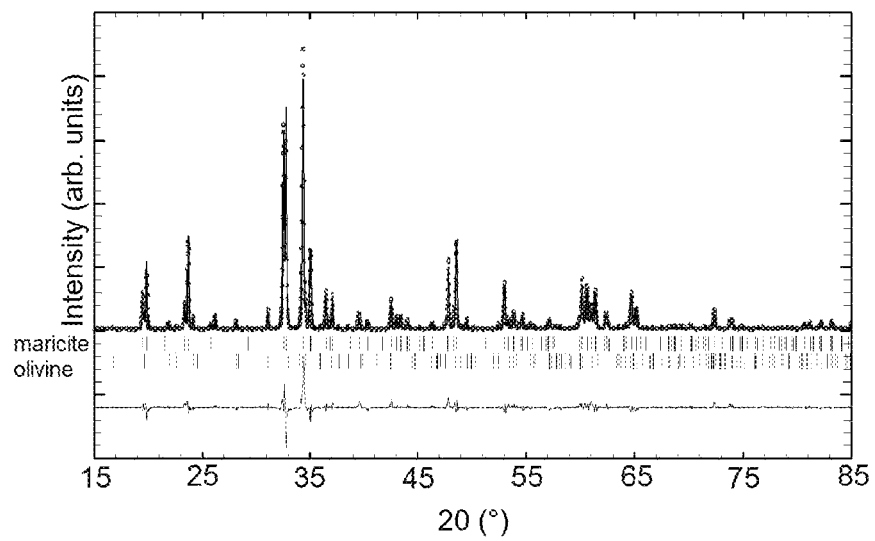
FIG. 14: Rietveld refinement matching of $NaMnPO_4$ maricite phase.

X-Ray diffraction was used for the phase identification and structural characterization. FIG. 14 corresponds to a Rietveld profile matching which reveals that the compound crystallized with the characteristic orthorhombic maricite phase (Pnma). However, there are some peaks that correspond to olivine phase as impurities (*). The determined unit cell parameters were a=9.0990(4) Å, b=6.9010(2) Å and c=5.1176(2) Å for the maricite phase and a=10.540(1) Å, b=6.3314(6) Å and c=4.9926(6) Å for the olivine phase. Moreover, Rietveld refinement allows for phase quantification, in which it was determined that 90% corresponds to maricite and 10% to olivine.

If the reaction is carried under air atmosphere, an olivine phase is obtained, whereas maricite phase is obtained under $N_2$ and using bubbled deionized water.

Example 6: Preparation of $NaMn_{1-x}Mg_xPO_4$ (x≈0.1, See Table 1)

Excess NaOH (0.036 moles) was dissolved in 10 mL of deionized water. 0.0108 moles of $MnSO_4 \cdot H_2O$ and 0.0012 moles of $MgSO_4$ were then dissolved in 9 mL and 1 mL of deionized water, respectively. First, $MgSO_4$ solution was added to $MnSO_4$ and was stirred until a homogeneous solution was obtained. 0.012 moles of $H_3PO_4$ solution were subsequently added to a graduated cylinder, which was then filled to 10 mL with deionized water. This last solution was added to the Mn—Mg solution, and it was stirred until a homogeneous solution was obtained. Finally, NaOH solution was added to the solution of Mn—Mg—P, which was also stirred until a homogeneous dense solution was obtained. The pH of the final solution (total volume 30 mL) was higher than 10. Powders crystallized in the olivine structure were grown in the autoclave at 200° C. for 4 hours. In order to avoid any transformation from olivine to maricite, a fast cooling (quenching) of the autoclave was carried out.

Figure 15:
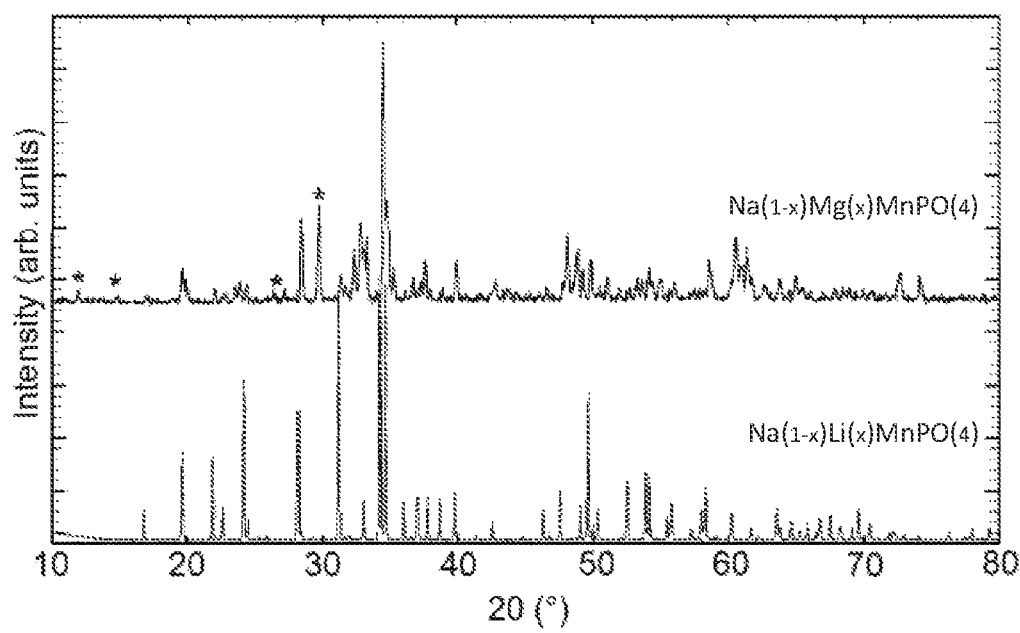
FIG. 15: XRD diffraction pattern matching of $Na_{1-x}Mg_xMnPO_4$.

FIG. 15 illustrates the X-Ray diffraction pattern of the compound obtained by hydrothermal method. The pattern has been compared with the reported one in Example 2 ($Na_{1-x}Li_xMnPO_4$). The XRD reveals that the compound crystallized with the characteristic orthorhombic olivine phase (Pnma). Nonetheless, there are some peaks attributed to unknown impurities (*). The Lebail profile matching is ongoing in order to determine the unit cell parameters. However, when comparing both compositions, the peaks of $Na_{1-x}Mg_xMnPO_4$ are shifted at higher 2θ leading to a decrease of the unit cell parameters. Taking into account the higher ionic radii of Mg than Li, peaks shifted at lower 2θ were expected.

In this example, the method was performed under $O_2$ atmosphere.

Example 7: Preparation of a $Na_{1-x}Li_xFe_yMn_{1-y}PO_4$
($x \approx 0.1$, $y \approx 0.5$, See Table 1)

Excess NaOH (0.036 moles) was dissolved in 10 mL of deionized water. Then 0.0054 moles of $FeSO_4 \cdot 7H_2O$, 0.0054 moles of $MnSO_4 \cdot H_2O$, and 0.012 moles of $LiOH \cdot H_2O$ were dissolved in 4.5 mL, 4.5 mL, and 1 mL of deionized water, respectively. First, Mn-solution was added to $FeSO_4$ solution and was mixed. Then LiOH solution was added to the Fe—Mn solution and mixed under stirring until a homogeneous solution was obtained. After that 0.012 moles of solution of $H_3PO_4$ were added in a graduated cylinder, which was then filled to 10 mL with deionized water. This last solution was added to the Fe—Mn—Li solution and was stirred until a homogeneous solution was obtained. Finally, NaOH solution was added to the Fe—Mn—Li—P solution, and it was also stirred until a homogeneous dense solution was obtained. The pH of the final solution (total volume 30 mL) was higher than 10. A Teflon liner was filled with the final solution/mixture and the autoclave was sealed under $N_2$ atmosphere. Powders crystallized in the maricite structure were grown in the autoclave under stirring at 200° C. for 4 hours.

In this embodiment of the invention, the deionized water was previously bubbled under $N_2$ for 4-5 hours. The solutions, the mixtures, and the autoclave sealing were carried out in a glove box under $N_2$ atmosphere. The obtained solution was then filtered, and the product was washed with water (3-4 times) and ethanol (1 time). Then, it was dried at 60-75° C. overnight.

Figure 16:
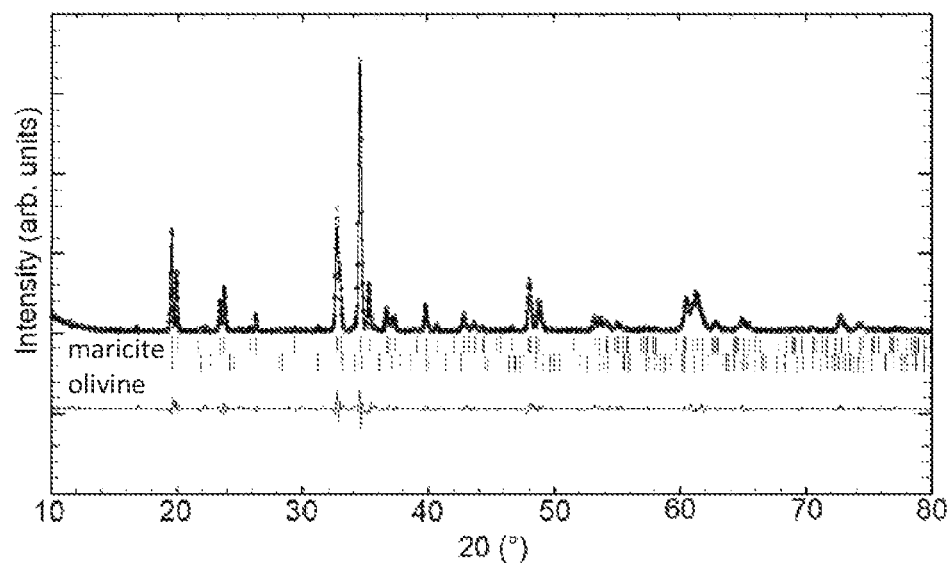
FIG. 16: LeBail profile matching for $Na_{1-x}Li_xFe_yMn_{1-y}PO_4$ (x≈0.1, y≈0.5), with $Y_{obs}$ (red line), $Y_{calc}$ (black line), $Y_{obs}$-$Y_{calc}$ (blue line) and Bragg position (vertical blue lines-maricite and vertical red lines-olivine).

X-Ray diffraction was used for the structural characterization and phase identification. FIG. 16 corresponds to a XRD LeBail profile matching of the compound obtained after hydrothermal synthesis, which reveals that the compound crystallized with the characteristic orthorhombic maricite phase (vertical blue lines). However, there are some peaks that correspond to olivine phase as impurities (FIG. 16, vertical red lines). The determined unit cell parameters were a=9.0563(5) Å, b=6.8781(5) Å and c=5.0861(3) Å for the maricite phase and a=10.522(2) Å, b=6.321(2) Å and c=4.9827(8) Å for the olivine phase (estimated composition $NaFe_{0.25}Mn_{0.75}PO_4$). Due to the low amount of the olivine phase (5% or less), the phase quantification is very difficult and cannot be accurate enough.

Example 8: Preparation of a $Na_{1-x}Li_xFe_yMn_{1-y}PO_4$
($x \approx 0.1$, $y \approx 0.75$, See Table 1)

Excess NaOH (0.036 moles) was dissolved in 10 mL of deionized water. 0.0078 moles of $FeSO_4 \cdot 7H_2O$, 0.003 moles of $MnSO_4 \cdot H_2O$, and 0.012 moles of $LiOH \cdot H_2O$ were then dissolved in 6.5 mL, 2.5 mL, and 1 mL of deionized water, respectively. First, Mn-solution was added to $FeSO_4$ solution and was mixed. LiOH solution was then added to Fe—Mn solution and mixed under stirring until a homogeneous solution was obtained. After that, 0.012 moles of solution of $H_3PO_4$ were added in a graduated cylinder, which was then filled to 10 mL with deionized water. This last solution was added to the Fe—Mn—Li solution and was stirred until a homogeneous solution was obtained. Finally, NaOH solution was added to the Fe—Mn—Li—P solution, and it was also stirred until getting a homogeneous dense solution. The pH of the final solution (total volume 30 mL) was higher than 10. A Teflon liner was filled with the final solution/mixture and the autoclave was sealed under $N_2$ atmosphere. Powders crystallized in the maricite structure were grown in the autoclave under stirring at 200° C. for 4 hours.

In this embodiment of the invention, the deionized water was previously bubbled under $N_2$ for 4-5 hours. In addition, the solutions, the mixtures, and the autoclave sealing were carried out in a glove box under $N_2$ atmosphere. After that, the obtained solution was filtered, and the product was washed with water (3-4 times) and ethanol (1 time). Then, it was dried at 60-75° C. overnight.

Figure 17:
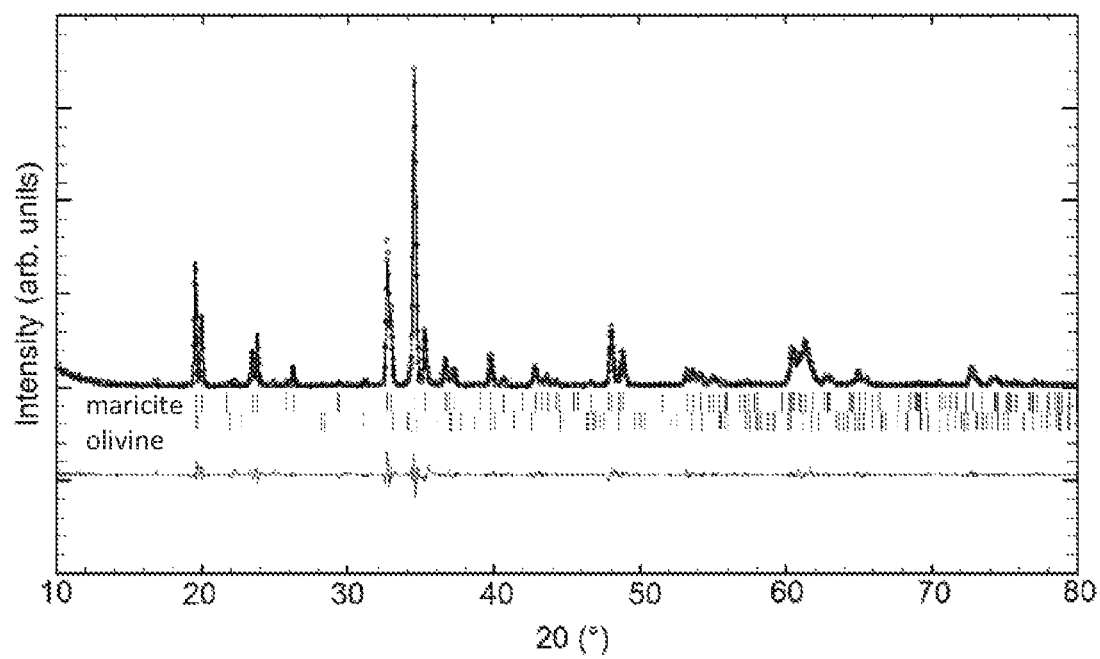
FIG. 17: LeBail profile matching for $Na_{1-x}Li_xFe_yMn_{1-y}PO_4$ (x≈0.1, y≈0.75), with $Y_{obs}$ (red line), $Y_{calc}$ (black line), $Y_{obs}$-$Y_{calc}$ (blue line) and Bragg position (vertical blue lines-maricite and vertical red lines-olivine).

X-Ray diffraction was used for the structural characterization and phase identification. FIG. 17 corresponds to a XRD LeBail profile matching of the compound obtained after hydrothermal synthesis which reveals that the compound crystallized with the characteristic orthorhombic maricite phase (FIG. 17, vertical blue lines). However, there are some peaks that correspond to olivine phase as impurities (FIG. 17, vertical red lines). The determined unit cell parameters were a=9.0267(5) Å, b=6.8692(5) Å and c=5.0678(3) Å for the maricite phase and a=10.518(1) Å, b=6.309(1) Å and c=4.9838(6) Å for the olivine phase (estimated composition $NaFe_{0.25}Mn_{0.75}PO_4$). Due to the low amount of the olivine phase (5% or less), the phase quantification presented some challenges.

Example 9 (comparative): Preparation of $Na_{1-x}Li_xFePO_4$ ($x \approx 0.1$, See Table 1)

Excess NaOH (0.36 moles) was dissolved in 100 mL of deionized water. Then 0.108 moles of $FeSO_4 \cdot 7H_2O$ and 0.012 moles of $LiOH \cdot H_2O$ were dissolved in 90 mL and 10 mL of deionized water, respectively. LiOH solution was added to $FeSO_4$ solution and mixed under stirring until a homogeneous solution was obtained. 0.12 moles of solution of $H_3PO_4$ were added in graduated cylinder, which was then filled to 100 mL with deionized water. This last solution was added to the Fe—Li solution and was stirred until a homogeneous solution was obtained. Finally, NaOH solution was added to the Fe—Li—P solution, and it was also stirred until a homogeneous dense solution was obtained. The pH of the final solution (total volume 300 mL) was 9-10. A glass liner was filled with the final solution/mixture and the autoclave was sealed under $N_2$ atmosphere. Powders crystallized in the maricite structure were grown in the autoclave under stirring at 200° C. for 4 hours (P≈2 MPa).

In this example, the deionized water was previously bubbled under $N_2$ for 4-5 hours. In addition, the solutions, the mixtures, and the autoclave sealing were carried out in a glove box under $N_2$ atmosphere. After that, the obtained solution was filtered, and the product was washed with water (3-4 times) and ethanol (1 time). Then, it was dried at 60-75° C. overnight.

Figure 18:
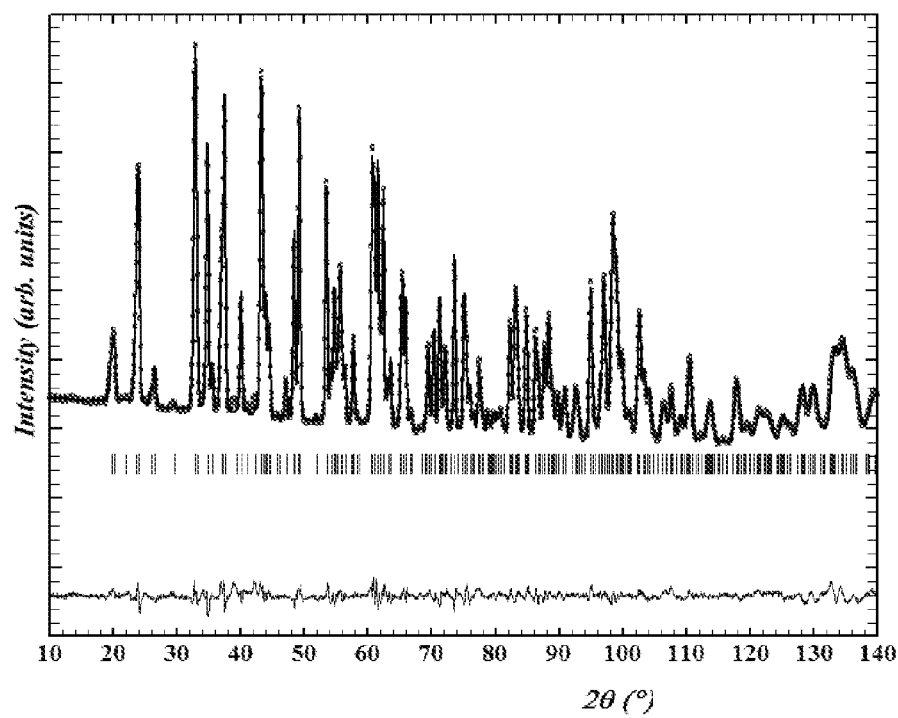
FIG. 18: Rietveld refinement of neutron diffraction for maricite $Na_{1-x}Li_xFePO_4$, with $Y_{obs}$ (red line), $Y_{calc}$ (black line), $Y_{obs}$-$Y_{calc}$ (blue line) and Bragg position (vertical blue lines), wherein λ=1.544402.
Figure 19:
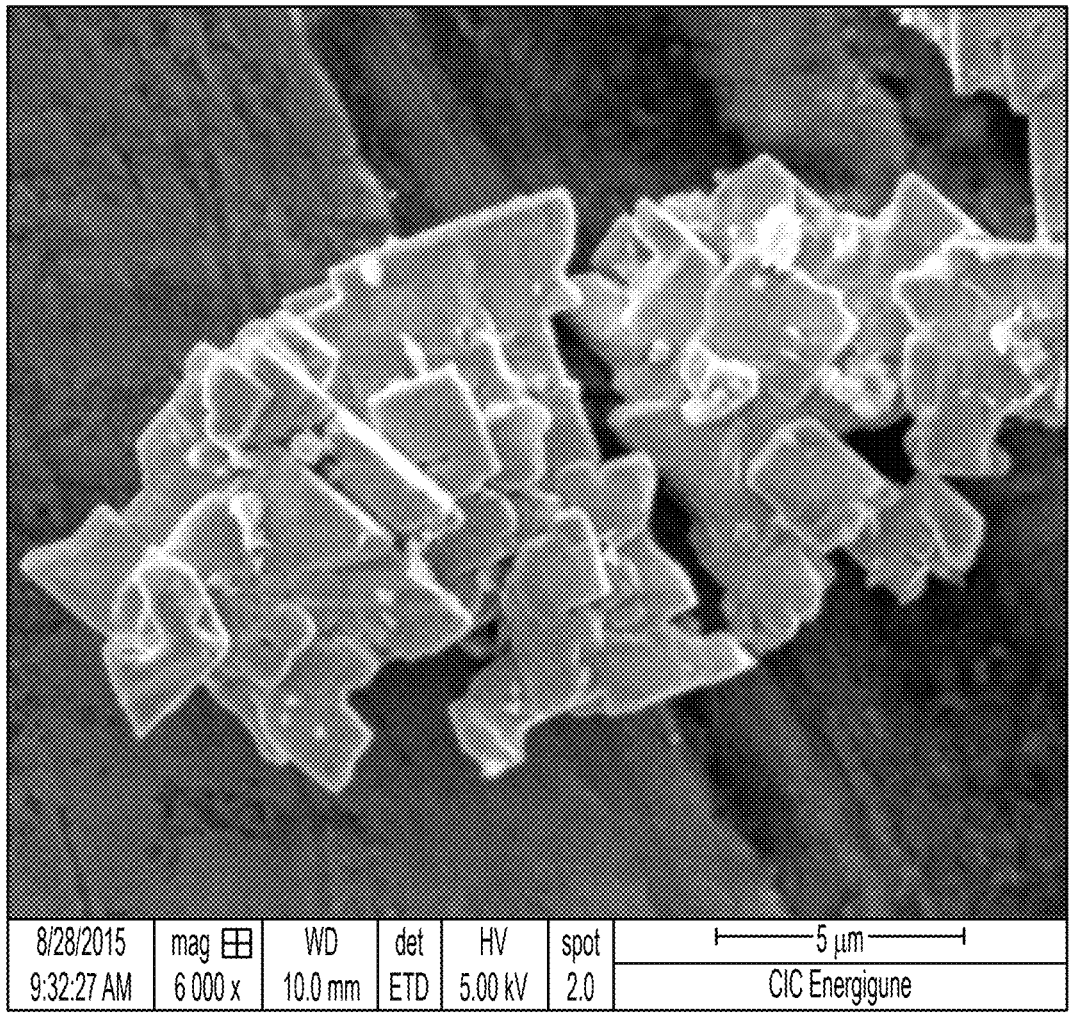
FIG. 19: SEM image of a sample of $Na_{1-x}Li_xFePO_4$.

Due to the high degree of purity of the sample, neutron diffraction was used for the structural characterization. FIG. 18 shows the Rietveld refinement for the obtained compound. In this case the compound crystallizes in the maricite Pnma structure with a=8.9953(9) Å, b=6.8610(7) Å and c=5.0455(5) Å as unit cell parameters, which are the values reported for maricite $NaFePO_4$ [24]. Three different structural models were used in the Rietveld refinement: (1) Li is located in the Na site, (2) Li is located in the Fe site and (3) Li is located in both Na and Fe sites. Due to the low amount of Li in the structure, distinguishing among the structural models presented some challenges. A time of flight—secondary ion mass spectroscopy analysis was carried out at IREQ facilities, which showed that the amount of Li in this structure was 0.2%. Moreover, scanning electron microscopy images showed a high degree of homogeneity, where the particles had a platelet-shape making up the aggregates (FIG. 19).

Despite the good Rietveld refinement of the neutron diffraction, it is difficult to determine the Li site due to its lower amount in the structure (assuming that Li ions are located in the Na site as in the previous examples).

In this comparative example, direct synthesis of olivine $Na_{1-x}Li_xFePO_4$ has not been demonstrated, as maricite $Na_{1-x}Li_xFePO_4$ has been obtained instead.

Examples 10a and 10b (Comparative): Preparation of a $NaFe_yMn_{1-y}PO_4$ (y≈0.5 or y≈0.75, See Table 1)

Example 10a: $NaFe_{0.5}Mn_{0.5}PO_4$

Excess NaOH (0.036 moles) was dissolved in 10 mL of deionized water. Then 0.006 moles of $FeSO_4·7H_2O$, 0.006 moles of $MnSO_4·H_2O$ were dissolved in 5 mL and 5 mL of deionized water, respectively. Firstly, Mn-solution was added to $FeSO_4$ solution, and it was mixed until homogeneous solution was obtained. After that 0.012 moles of solution of $H_3PO_4$ were added to a graduated cylinder, which was then filled to 10 mL with deionized water. This last solution was added to the Fe—Mn solution and was stirred until a homogeneous solution was obtained. Finally, NaOH solution was added to the Fe—Mn—P solution, and it was also stirred until getting a homogeneous dense solution. The pH of the final solution (total volume 30 mL) was higher than 10. A Teflon liner was filled with the final solution/mixture and the autoclave was sealed under $O_2$ atmosphere. Powders crystallized grown in the autoclave under stirring at 200° C. for 4 hours. After that a fast cooling (quenching) of the autoclave was carried out.

Example 10b: $NaFe_{0.75}Mn_{0.25}PO_4$

Excess NaOH (0.036 moles) was dissolved in 10 mL of deionized water. Then 0.009 moles of $FeSO_4·7H_2O$ and 0.003 moles of $MnSO_4·H_2O$ were dissolved in 7.5 mL and 2.5 mL of deionized water, respectively. First, Mn-solution was added to $FeSO_4$ solution, and it was mixed until a homogeneous solution was obtained. After that, 0.012 moles of solution of $H_3PO_4$ were added to a graduated cylinder, which was then filled to 10 mL with deionized water. This last solution was added to the Fe—Mn solution and was stirred until a homogeneous solution was obtained. Finally, NaOH solution was added to the Fe—Mn—P solution, and it was also stirred until getting a homogeneous dense solution. The pH of the final solution (total volume 30 mL) was higher than 10. A Teflon liner was filled with the final solution/mixture and the autoclave was sealed under $O_2$ atmosphere. Powders crystallized grown in the autoclave under stirring at 200° C. for 4 hours. After that a fast cooling (quenching) of the autoclave was carried out.

Figure 20:
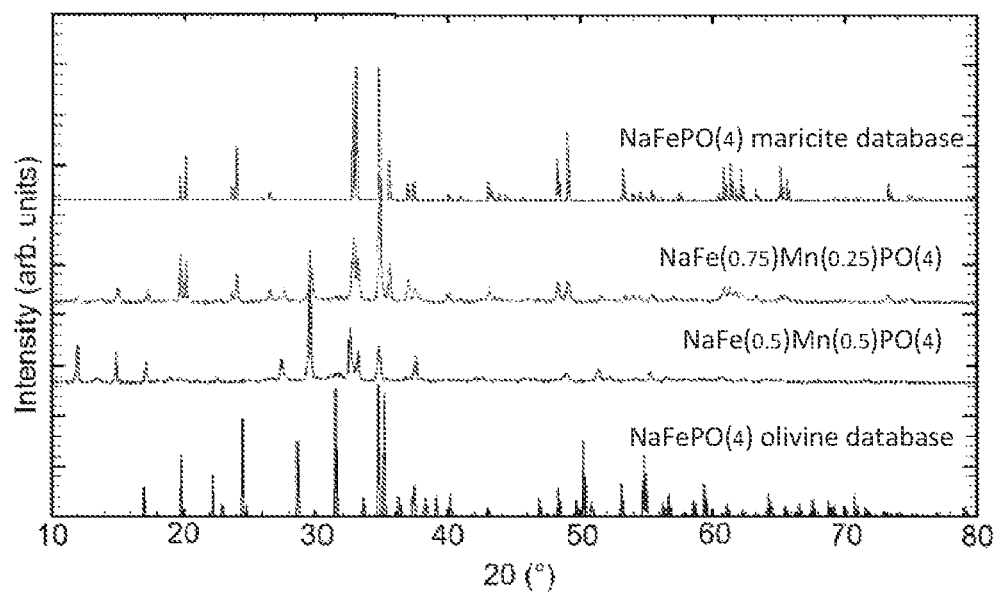
FIG. 20: X-Ray diffraction patterns of $NaFe_{0.5}Mn_{0.5}PO_4$ and $NaFe_{0.75}Mn_{0.25}PO_4$ obtained after hydrothermal method in $O_2$ atmosphere.

X-Ray diffraction was used for the structural characterization and phase identification. FIG. 20 shows the X-Ray diffraction patterns for compounds $NaFe_{0.5}Mn_{0.5}PO_4$ (Example 10a, red pattern) and $NaFe_{0.75}Mn_{0.25}PO_4$ (Example 10b, green pattern). Also, the patterns have been compared with the characteristic maricite and olivine $NaFePO_4$ database. As mentioned above, this synthesis was used to explore the effect of Li-absence and the $O_2$ atmosphere when the Fe content is higher than 0.25. Both compounds do not crystallize in the characteristic olivine structure. Mainly, $NaFe_{0.75}Mn_{0.25}PO_4$ crystallizes in the maricite phase, however there are some peaks attributed to unknown impurities (*). Whereas the $NaFe_{0.5}Mn_{0.25}PO_4$ (Example 10b, green pattern) is more complex, this compound does not crystallize in the maricite phase or the olivine phase.

This comparative example explored the effect of non-Li-doping and $O_2$ atmosphere. Direct synthesis of olivine $NaFe_xMn_{1-x}PO_4$ (x≈0.5 and x≈0.75) was not achieved. Rather, maricite $NaFe_{0.75}Mn_{0.5}PO_4$ has been obtained instead, as the higher amount of Fe probably induces the maricite phase.

Electrochemical Test

Figure 21:
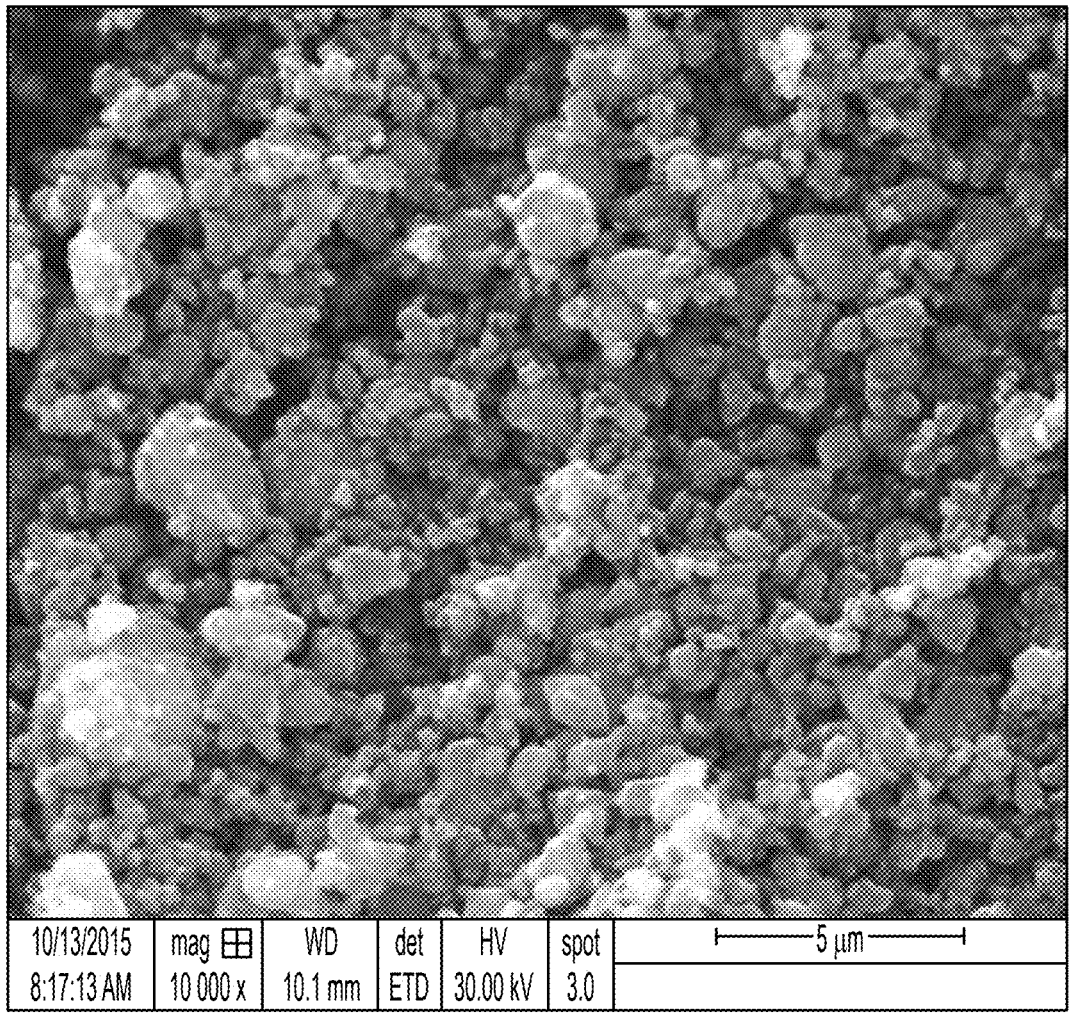
FIG. 21: SEM image of mixture active material:carbon (80:20) after ball milling.

First test: preliminary tests were conducted using active material power (Example 1) mixed with Denka carbon with a ratio of 80:20 (active material: carbon) using ball milling. Ball milling was used to decrease the particle size of the prepared material and also to ensure good homogeneity of the mixture. FIG. 21 shows a SEM image after ball milling treatment; a good homogeneity of the sample but also the presence of agglomerates of small particles (mainly, less than 500 nm) can be observed.

Coin cell was assembled using a sodium metal as anode, Watman GF/D borosilicate glass fiber as a separator, and 1M $NaPF_6$ Ethylene carbonate: Dimethyl carbonate (EC:DMC) as an electrolyte, as well as using a MACCOR battery test system.

Figure 22A:
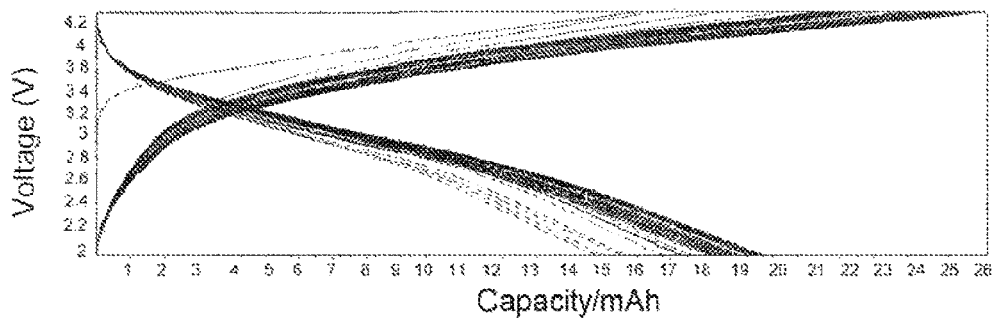
FIG. 22A: Galvanostatic charge and discharge curves of $Na_{1-x}Li_xMnPO_4$.
Figure 22B:
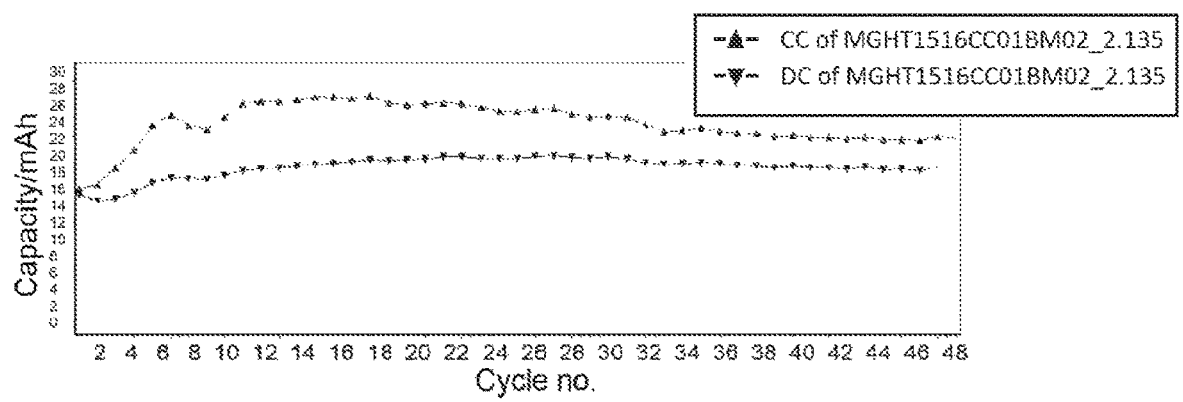
FIG. 22B: Capacity retention of $Na_{1-x}Li_xMnPO_4$ (from Example 1).

$Na_{1-x}Li_xMnPO_4$ (theoretical capacity of 145 mA·h/g) was tested versus lithium and sodium metal using galvanostatic charge and discharge curves at C/20 (FIG. 22A and FIG. 22B). While the material is electrochemically active for both ions, both curves exhibit low capacity, far from the theoretical one, as well as a poor cyclability and high polarization.

Second test: a challenge with these new olivine compounds is to find a methodology for the carbon coating process. Temperatures over 400° C. are probably to be avoided since a phase transition from olivine to maricite may occur. A composite may be prepared by mixing $Na_{0.966}Li_{0.034}MnPO_4$ (Example 2) with C65 using a ball milling. Then the mixture may be thermally treated under Argon at 400° C. for 3 hours. The compound obtained may be tested versus metallic sodium and compared with the results obtained in the first test.

The scope of the claims should not be limited by the preferred embodiments set forth in the examples but should be given the broadest interpretation consistent with the description as a whole.

The present description refers to a number of documents, the content of which is herein incorporated by reference in their entirety.

REFERENCES

[1] R. A. Huggins. Advanced Batteries: Materials Science Aspects. (Springer, 2009).
[2] J. M. Tarascon and M. Armand, *Nature* 2001, 414, 359.
[3] M. Armand and J. M. Tarascon, *Nature* 2008, 451, 652.
[4] M. S. Whittingham, *Chem. Rev.* 2004, 104, 4271.
[5] J. B. Goodenough, *J. Power Sources* 2007, 174, 996.
[6] J. W. Fergus, *J. Power Sources* 2010, 195, 939.
[7] A. Padhi, K. S. Nanjuindaswamy and J. B. Goodenough, *J. Electrochem. Soc.* 1997, 144, 1188.
[8] B. L. Ellis, K. T. Lee and L. F. Nazar, *Chem. Mater.* 2010, 22, 691.
[9] H. Hyand, S. C. Yin and L. F. Nazar, *Electrochem. Solid State Lett.* 2001, A, A170-A171.
[10] K. Zaghib, A. Guerfi, P. Hovington, A. Vijh, M. Trudeau, A. Mauger, J. B. Goodenough and C. M. Julien, *Journal of Power Sources* 2013, 232, 357-369.
[11] J.-M. Tarascon, *Nat. Chem.* 2010, 2, 510.
[12] C. Wadia, P. Albertus and V. J. Srinivasan, *Power Sources* 2011, 196, 1593.
[13] V. Palomares, P. Serras, I. Villaluenga, K. B. Hueso, J. Carretero-Gonzalez and T. Rojo, *Energy Environ. Sci.* 2012, 5, 5884.
[14] M. D. Slater, D. Kim, E. Lee and C. S. Johnson, *Adv. Funct. Mater.* 2013, 23, 947.
[15] S. Komaba, W. Murata, T. Ishikawa, N. Yabuuchi, T. Ozeki, T. Nakayama, A. Ogata, K. Gotoh and K. Fujiwara, *Adv. Funct. Mater.* 2011, 21, 3859.
[16] V. Palomares, M. Casas-Cabanas, E. Castillo-Martinez, M. H. Han and T. Rojo, *Energy Environ. Sci.* 2013, 6, 2312.
[17] S. W. Kim, D. H. Seo, X. H. Ma, G. Ceder and K. Kang, *Adv. Energy Mater.* 2012, 2, 710.
[18] G. H. Newman and L. P. Klemann, *J. Electrochem. Soc.* 1980, 197, 2097.
[19] Shyue Ping Ong, Vincent L. Chevrier, Geoffroy Hautier, Anubhav Jain, Charles Moore, Sangtae Kim, Xiaohua Ma and Gerbrand Ceder, *Energy Environ. Sci.* 2011, 4, 3680-3688.
[20] Y. Le Page and G. Donnay, *Can. Miner.* 1977, 15, 518-521.
[21] P. Moreau, D. Guyomard, J. Gaubicher and F. Boucher, *Chemistry of Materials* 2010, 22, 4126-4128.
[22] A. Sun, F. R. Beck, D. Haynes, J. A. Poston, S. R. Narayanan, P. N. Kumta and A. Manivannan, *Mater. Sci. Eng.*, B 2012, 177, 1729-1733.
[23] J. Kim, D.-H. Seo, H. Kim, I. Park, J.-K. Yoo, S.-K. Jung, Y.-U. Park, W. A. Goddard III and K. Kang, *Energy Environ. Sci.* 2015, 8, 540-545.
[24] K. Zaghib, J. Trottier, P. Hovington, F. Brochu, A. Guerfi, A. Mauger, C. M. Julien, *J. Power Sources* 2011, 196, 9612-9617.
[25] Pier Paolo Prosini Cinzia Cento a, Amedeo Masci and Maria Carewska, *Solid State Ionics* 2014, 263, 1-8.
[26] M. Casas-Cabanas, V. V. Roddatis, D. Saurel, P. Kubiak, J. Carretero-Gonzalez, V. Palomares, P. Serras and T. Rojo, *J. Mater. Chem.* 2012, 22(34), 17421.
[27] Montserrat Galceran, Damien Saurel, Begoña Acebedo, Vladimir V. Roddatis, Egoitz Martin, Teófilo Rojo and Montse Casas-Cabanas, *Phys. Chem. Chem. Phys.* 2014, 16, 8837-8842.
[28] Violeta Koleva, Tanya Boyadzhieva, Ekaterina Zhecheva, Diana Nihtianova, Svetlana Simova, Georgi Tyuliev and Radostina Stoyanova, *CrystEngComm*, 2013, 15, 9080-9089.
[29] K. T. Lee, T. N. Ramesh, F. Nan, G. Botton and L. F. Nazar, *Chem. Mater.*, 2011, 23, 3593-3600.
[30] Chun Li, Xue Miao, Wei Chu, Ping Wu and Dong Ge Tong, *J. Mater. Chem. A* 2015, 00, 1-6.

The invention claimed is:

1. A method of preparing a cathode material comprising a compound of general formula $Na_hM_iM'_jM''_kPO_4$, wherein: $0<h\le1$, $0<i\le1$, $0<j\le1$ and $0<k\le1$, and wherein M, M' and M'' are each independently a metal, the method comprising the steps of:
   (a) preparing an aqueous mixture comprising a M-containing compound, a M'-containing compound and a M''-containing compound to obtain a M-M'-M'' mixture;
   (b) adding a P-containing compound to the M-M'-M'' mixture to obtain a M-M'-M''-P mixture;
   (c) adding a Na-containing compound to the M-M'-M''-P mixture to obtain a Na-M-M'-M''-P mixture;
   (d) introducing the Na-M-M'-M''-P mixture into an autoclave to perform crystal growth and obtain the compound of general formula $Na_hM_iM'_jM''_kPO_4$;
   (e) fast-cooling the crystals; and
   (f) drying the cooled crystals.

2. The method of claim 1, wherein step (f) is performed at a temperature of about 50-85° C. for a period of about 6-12 hours.

3. The method of claim 1, wherein step (f) is performed at a temperature of about 60-75° C. for a period of about 8-10 hours.

4. The method of claim 1, wherein step (a) comprises preparing separate aqueous solutions of the M-containing compound, the M'-containing compound and the M''-containing compound, first mixing two of the three solutions and then adding the third solution to obtain the M-M'-M'' mixture.

5. The method of claim 1, wherein each of steps (a)-(c) is performed under stirring.

6. The method of claim 1, wherein step (c) comprises preparing an aqueous solution of the Na-containing compound and adding the solution to the M-M'-M''-P mixture.

7. The method of claim 1, wherein step (d) is performed under an atmosphere of $O_2$, $N_2$ or a combination thereof.

8. A method of preparing a cathode material comprising a compound of general formula $Na_hM_iM'_jM''_kPO_4$, wherein: $0<h\le1$, $0<i\le1$, $0<j\le1$ and $0<k\le1$, and wherein M, M' and M'' are each independently a metal, the method comprising the steps of:
   (a) preparing an aqueous mixture comprising a M-containing compound, a M'-containing compound and a M''-containing compound to obtain a M-M'-M'' mixture;
   (b) adding a P-containing compound to the M-M'-M'' mixture to obtain a M-M'-M''-P mixture;
   (c) adding a Na-containing compound to the M-M'-M''-P mixture to obtain a Na-M-M'-M''-P mixture; and (d) introducing the Na-M-M'-M"-P mixture into an autoclave to perform crystal growth and obtain the compound of general formula $Na_hM_iM'_jM''_kPO_4$, wherein step (d) is performed at a temperature of about 150-250° C. for a period of about 2-6 hours under a pressure of about 1.5-2.5 MPa.

9. The method of claim 8, wherein step (d) is performed at a temperature of about 200° C. for a period of about 4 hours under a pressure of about 2 MPa.

10. The method of claim 8, wherein the aqueous mixture comprises deionized water bubbled under N2.

11. The method of claim 8, wherein the M-containing compound, the M'-containing compound and the M"-containing compound are each independently selected from the group consisting of $MnSO_4$, $LiOH$, $FeSO_4$ and $MgSO_4$.

12. The method of claim 8, wherein the compounds are each independently a hydrated compound.

13. A method of preparing a cathode material comprising a compound of general formula $Na_hM_iM'_jM''_kPO_4$, wherein: $0<h\le1, 0<i\le1, 0<j\le1$ and $0<k\le1$, and wherein M, M' and M" are each independently a metal, the method comprising the steps of:

(a) preparing an aqueous mixture comprising a M-containing compound, a M'-containing compound and a M"-containing compound to obtain a M-M'-M" mixture;

(b) adding a P-containing compound to the M-M'-M" mixture to obtain a M-M'-M"-P mixture;

(c) adding a Na-containing compound to the M-M'-M"-P mixture to obtain a Na-M-M'-M"-P mixture; and (d) introducing the Na-M-M'-M"-P mixture into an autoclave to perform crystal growth and obtain the compound of general formula $Na_hM_iM'_jM''_kPO_4$, wherein the P-containing compound is $H_3PO_4$.

14. The method of claim 13, wherein the Na-containing compound is NaOH.

15. The method of claim 13, wherein the Na-containing compound is used in an excess amount.

16. The method of claim 13, wherein, in the general formula $Na_hM_iM'_jM''_kPO_4$, $h=1$ and $0\le i\le0.2$ and $0\le j\le0.8$ and $0.85\le i+j+k\le1$.

* * * * *